United States Patent
Rao

(10) Patent No.: US 8,669,792 B2
(45) Date of Patent: Mar. 11, 2014

(54) VOLTAGE MODE DRIVER USING PRE-EMPHASIS AND DE-EMPHASIS SIGNALS

(71) Applicant: Venkata N. S. N. Rao, Fremont, CA (US)

(72) Inventor: Venkata N. S. N. Rao, Fremont, CA (US)

(73) Assignee: Kool Chip, Inc., San Jose, CA (US)

( * ) Notice: Subject to any disclaimer, the term of this patent is extended or adjusted under 35 U.S.C. 154(b) by 0 days.

(21) Appl. No.: 13/667,290

(22) Filed: Nov. 2, 2012

(65) Prior Publication Data

US 2013/0057321 A1 Mar. 7, 2013

Related U.S. Application Data

(63) Continuation-in-part of application No. 13/225,381, filed on Sep. 2, 2011, now abandoned.

(51) Int. Cl.
*H03K 3/00* (2006.01)

(52) U.S. Cl.
USPC ............................. 327/108; 327/112; 326/83

(58) Field of Classification Search
USPC ............ 327/108–112; 326/82, 83, 86, 87, 27, 326/30
See application file for complete search history.

(56) References Cited

U.S. PATENT DOCUMENTS

| | | | |
|---|---|---|---|
| 6,704,818 B1 | | 3/2004 | Martin et al. |
| 7,109,744 B1 * | | 9/2006 | Shumarayev et al. .......... 326/30 |
| 7,501,851 B2 * | | 3/2009 | Venditti et al. .................. 326/30 |
| 7,944,233 B1 * | | 5/2011 | Lee ................................. 326/30 |
| 2010/0079167 A1 | | 4/2010 | Thomsen |

* cited by examiner

*Primary Examiner* — Lincoln Donovan
*Assistant Examiner* — Thomas Skibinski
(74) *Attorney, Agent, or Firm* — Venture Pacific Law, PC

(57) ABSTRACT

A driver comprises, an input block for receiving one or more data signals and one or more control signals; a data control block for processing the data signals and the control signals to determine one or more modified control signals, wherein the modified control signal is determined as a function of one or more de-emphasis signals, one or more pre-emphasis signals, and the control signals; and a driver block for receiving the modified control signals and generating one or more output data signals.

20 Claims, 19 Drawing Sheets

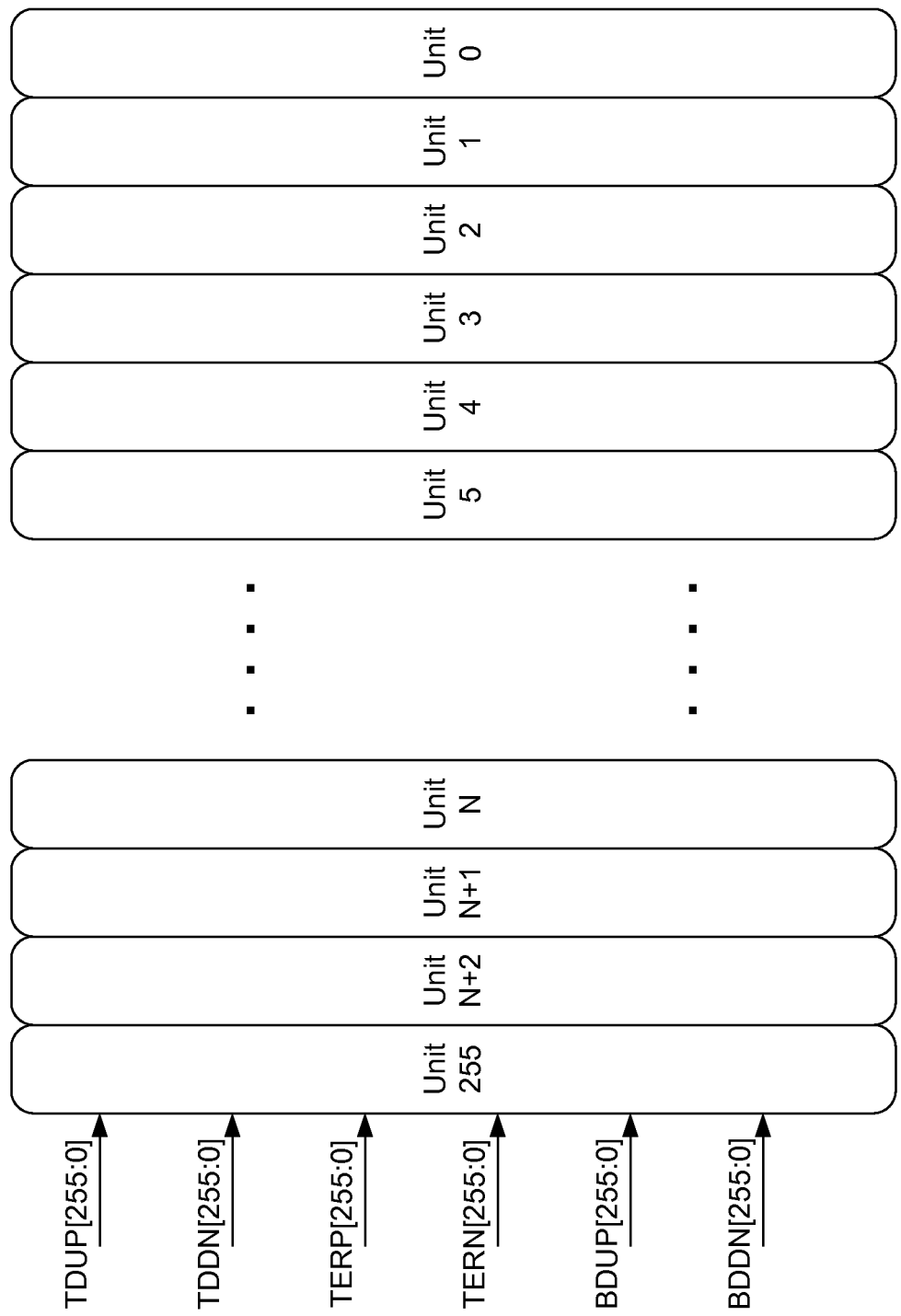

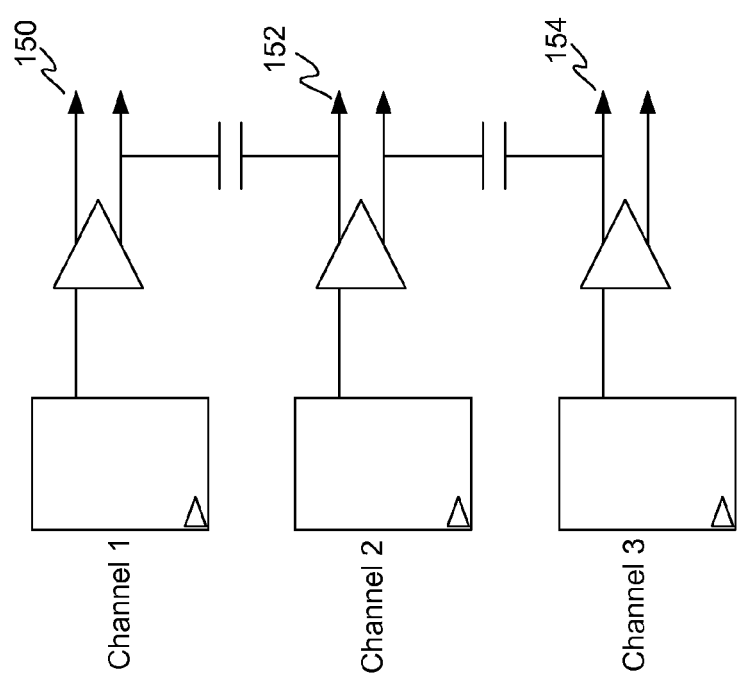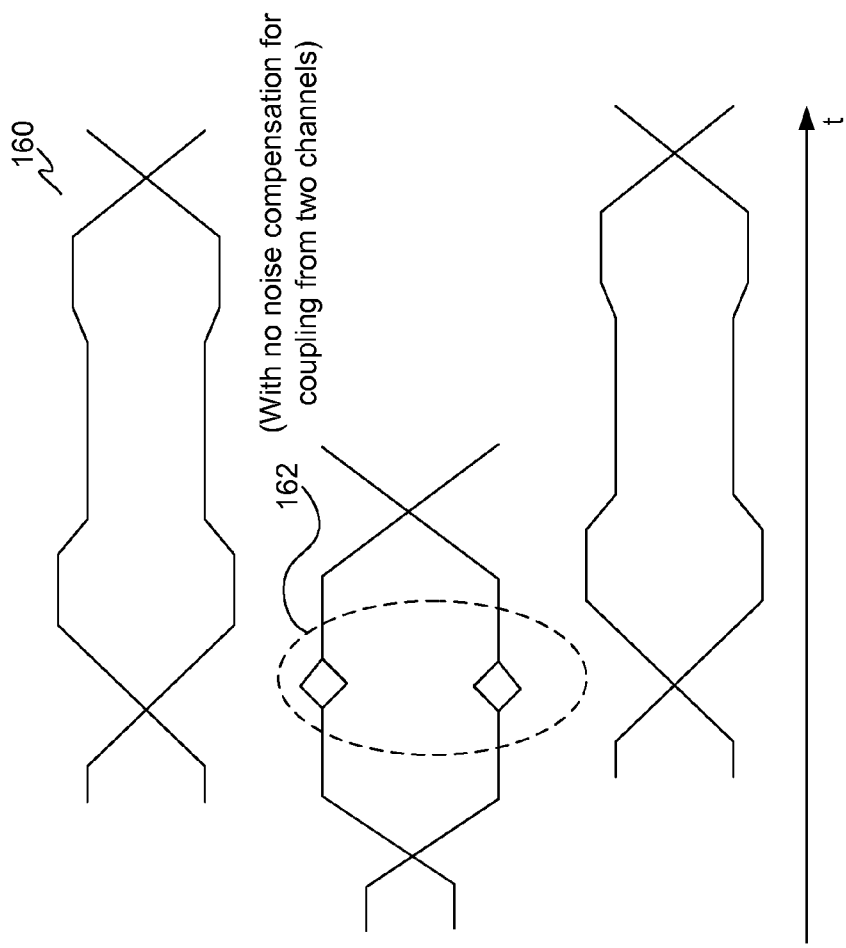
Fig. 13a

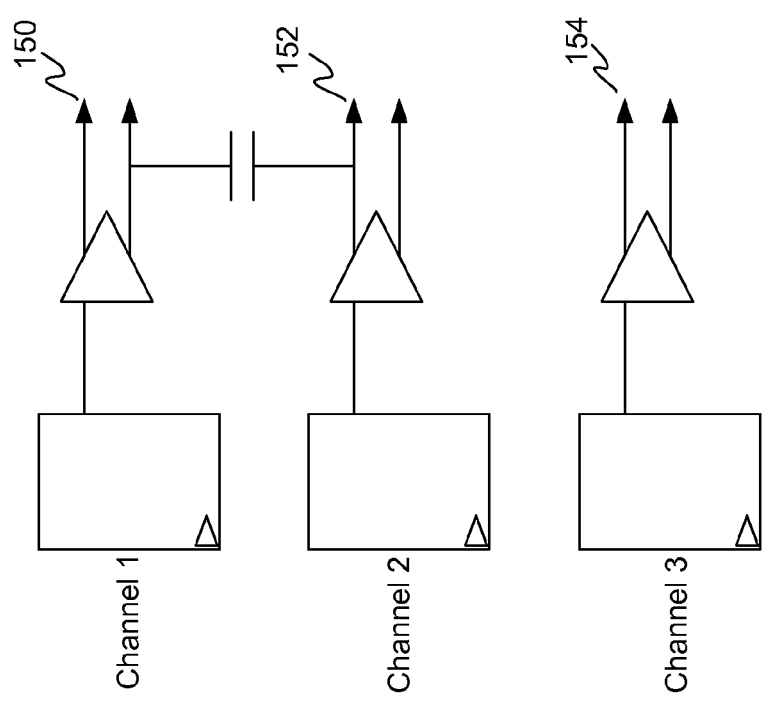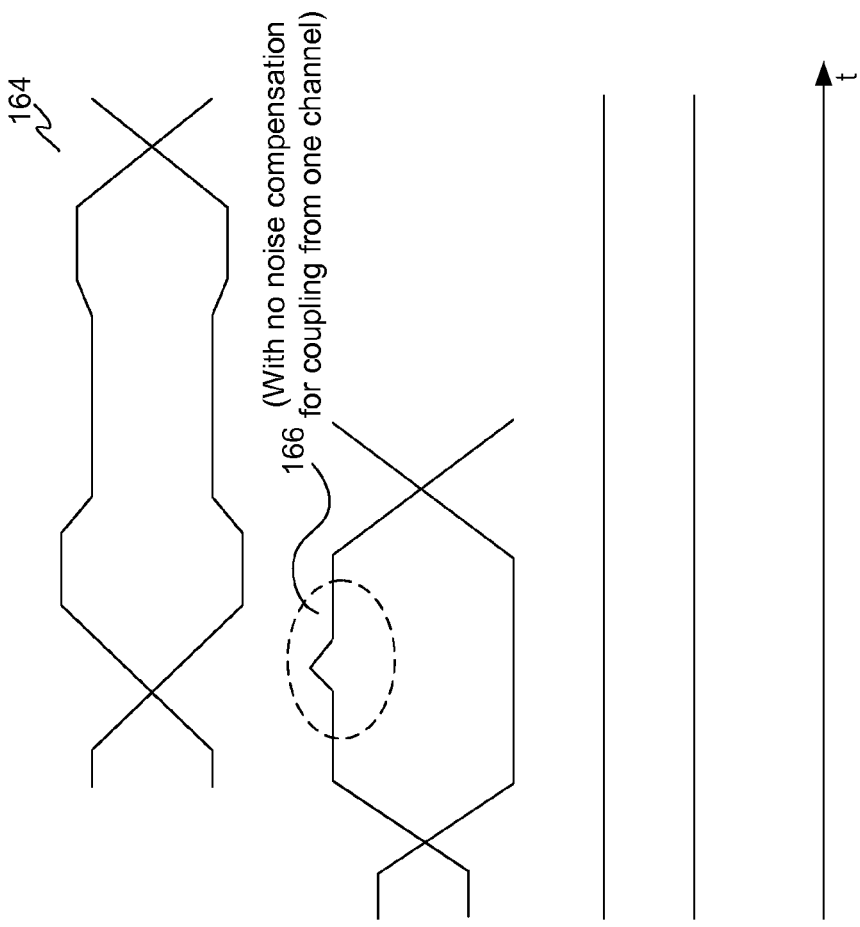
Fig. 13b

VOLTAGE MODE DRIVER USING PRE-EMPHASIS AND DE-EMPHASIS SIGNALS

CROSS REFERENCE

This application claims priority from a non-provisional patent application entitled "A Voltage Mode Driver" filed on Sep. 2, 2011 and having an application Ser. No. 13/225,381. Said application is incorporated herein by reference.

FIELD OF INVENTION

This invention generally relates to a voltage mode driver, and, in particular, to a differential voltage mode driver that supports n-taps and low power swing operation.

BACKGROUND

In high speed data transmission systems, a transmitter consumes the most power in such systems. For low power applications, it is important to reduce this power consumption by the transmitter. One method to conserve power is to lower the operating voltage for the transmitter to reduce the overall power consumption. However, this does not aid in power reduction at the final stage driver, where, conventionally, current differential drivers are used because of their low susceptibility to power supply noise. For example, a typical 1 volt, 50 ohms differential driver with a termination of 100 ohms can consume around 20 mA, a relatively large amount of current. Furthermore, supporting multiple taps can lead to even more power usage.

A voltage mode driver can be used instead of a current differential driver, where the voltage mode driver may only consume 5 mA to achieve the same driver characteristics. However, typical voltage mode drivers consume more current in pre- and de-emphasis modes and are difficult to incorporate for a pre-defined number of taps. Therefore, it is desirable to provide new voltage mode drivers that allow for constant compensated impedance, e.g., by process, voltage and temperature ("PVT") tuning, in an n-tap operation and consume less current in an n−1 tap operation. It is also desirable to provide new voltage mode drivers for an n+1 tap operation (including tri-state) with minimal skew impact.

Another problem for voltage mode drivers is that noise coupling from an adjacent channel can cause signal distortion at the receiving end of the channel. Various methods can be used to take care of noise at the design phase. However, effective techniques are not available once the design is completed. Therefore, it is desirable to provide new methods and circuits for noise cancellation.

SUMMARY OF INVENTION

An object of this invention is to provide a low power voltage mode driver with multi-tap pre-emphasis and de-emphasis.

Another object of this invention is to provide a voltage mode driver with cross talk cancellation.

Yet another object of this invention is to provide a voltage mode driver with a PVT tuning mode.

Briefly, the present invention discloses a driver comprising, an input block for receiving one or more data signals and one or more control signals; a data control block for processing the data signals and the control signals to determine one or more modified control signals, wherein the modified control signal is determined as a function of one or more de-emphasis signals, one or more pre-emphasis signals, and the control signals; and a driver block for receiving the modified control signals and generating one or more output data signals.

An advantage of this invention is that a low power voltage mode driver with multi-tap pre-emphasis and de-emphasis is provided.

Another advantage of this invention is that a voltage mode driver with cross talk cancellation is provided.

Yet another advantage of this invention is that a voltage mode driver with a PVT tuning mode is provided.

DESCRIPTION OF THE DRAWINGS

The foregoing and other objects, aspects, and advantages of the invention can be better understood from the following detailed description of the preferred embodiment of the invention when taken in conjunction with the accompanying drawings in which:

FIG. 5 illustrates a block diagram for an equally weighted driver of the present invention having unit cell drivers of equal weight.

FIGS. 13a and 13b illustrate graphical representations of noise induced from adjacent switching channels.

DETAILED DESCRIPTION OF THE PREFERRED EMBODIMENTS

In the following detailed description of the embodiments, reference is made to the accompanying drawings, which form a part hereof, and in which is shown by way of illustration of specific embodiments in which the present invention may be practiced.

Most passive components have little temperature and voltage dependency, whereas active components have a high degree of dependency on the voltage and temperature. The characteristics of devices and linearity of drivers necessitate that the passive components be a greater portion of the total components to reduce the dependency on temperature and voltage for such systems. However, this increases the output capacitance as well as the load on the pre-driver.

A compromise is to use a driver having a plurality of unit cell drivers, where the unit cell drivers' ratio between a resistor and a switch resistance of the unit cell is greater than or equal to 2:1 (or another predefined ratio) in any given corner and temperature. This can be good enough to satisfy the linearity requirement and to impose a small load on the output pad.

Generally, the present invention discloses various differential voltage mode drivers with a high degree of PVT compensation using a low number of bits. The differential voltage mode drivers can use the following techniques: (1) an equal weighted legs technique; (2) two binary weighted legs with a first unit cell technique; (3) binary weighted legs with a second unit cell technique; and (4) binary weighted legs with a third unit cell technique for compensation. Furthermore, low power n-cap capability is achieved using these different techniques by utilizing a variable driver strength and termination between positive and negative terminals of the driver. In addition, other techniques and combinations of the foregoing are apparent based upon the present disclosure for voltage mode drivers.

Figure 1:
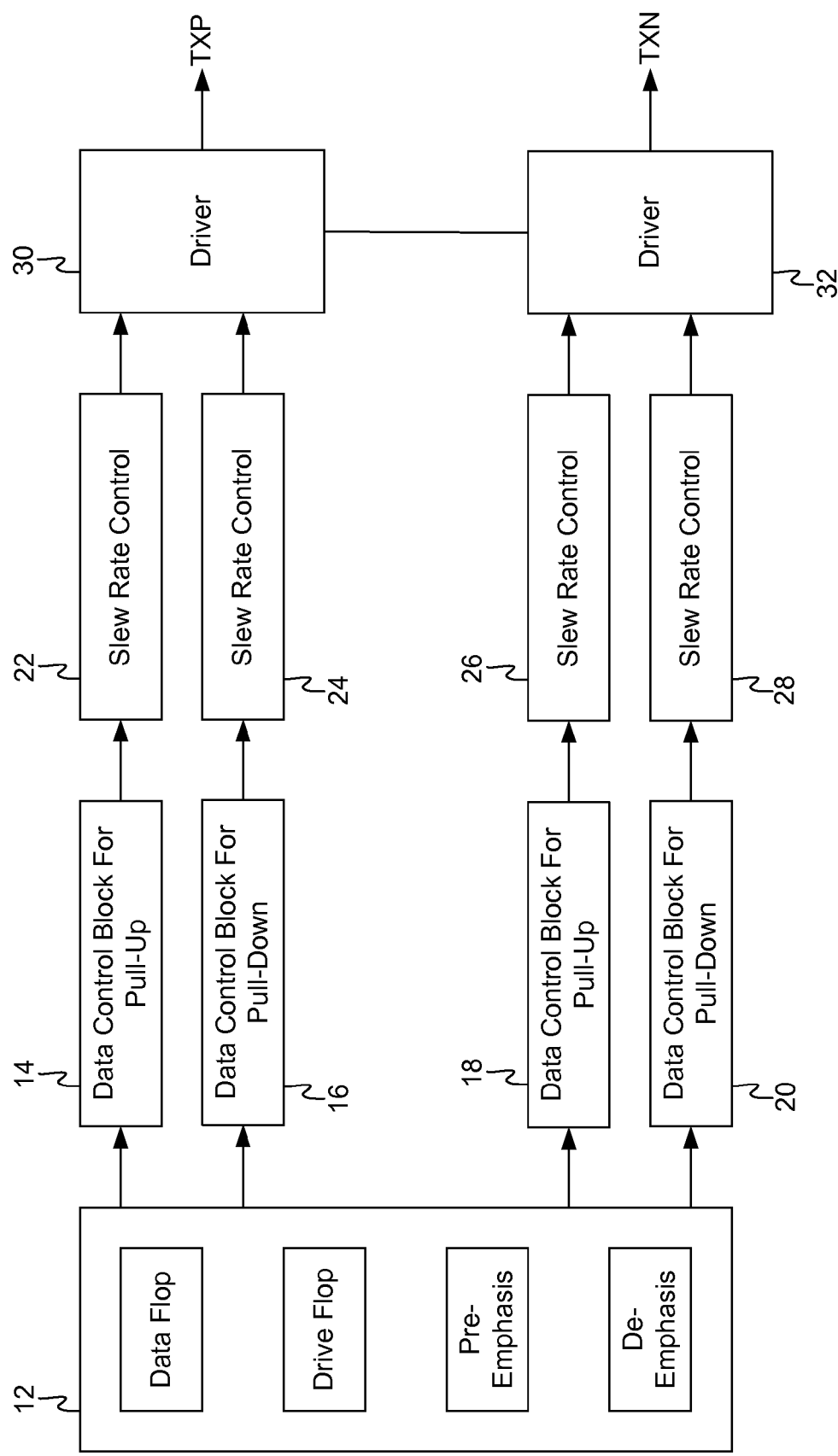
FIG. 1 illustrates a block diagram of a voltage mode driver of the present invention.

FIG. 1 illustrates a block diagram of a differential voltage mode driver of the present invention. A differential voltage mode driver of the present invention comprises an input block 12, data control blocks 14-20, slew rate control blocks 22-28, and drivers 30 and 32. The input block 12 inputs various data signals and control signals to the data control blocks 14-20. The input block 102 comprises a data flop for receiving the odd data and even data from a parallel-to-serial serializer (not shown), a drive flop for receiving a PVT compensation control signal, a pre-emphasis block, and a de-emphasis block. The pre-emphasis and de-emphasis blocks aid in increasing signal quality by receiving the odd and even data and applying pre-emphasis and de-emphasis signals as compensation by enabling and disabling various unit cell drivers in the respective drivers 30 and 32.

Each of the data control blocks 14-20 contain one or more logic blocks for receiving the various data and control signals to control various segments of unit cell drivers and individual unit cell drivers within the driver blocks 30 and 32. For instance, the segments of a driver can be enabled and disabled based upon the PVT compensation control signal to calibrate the respective driver. In addition, the unit cell drivers can also be individually (or in a segment) enabled and disabled based upon pre-emphasis signals and de-emphasis (also referred to as post-emphasis) signals for the data signals.

The data control block 14 is for the pull-up of the TXP output, and the data control block 16 is for the pull-down of the TXP output. The data control block 18 is for the pull-up of the TXN output, and the data control block 20 is for the pull-down of the TXN output. Generally, if the data is high, then the pull-up control will pull the TXP output high and if the data is low, then the pull-down control block will pull the TXP output low. Similarly for data control blocks 18 and 20, if the received data is high the pull-up control will pull the TXN output high and if the data is low, then the pull-down control block will pull the TXN output low Slew rate control blocks 22-28 can be optionally added to control the slew rates of the respective signals before being inputted to the drivers 30 and 32. The slew rate control blocks 22-28 aid in reducing switching noise and increase signal integrity. The driver 30 is used to drive one of the differential outputs TXP; and the driver 32 drives the other differential output TXN. Each of the drivers 30 and 32 comprise one or more unit cell drivers having outputs connected together in parallel to generate the differential outputs TXP and TXN.

Generally, if a driver comprises several unit cell drivers, the unit cell drivers of the driver can be grouped together into several groups. Thereby reducing the number of control signals needed to enable, disable, and otherwise control the various unit cell drivers of the driver. The unit cell drivers and entire groups (if any) can be enabled and disabled during calibration of the driver to account for PVT variations, pre-emphasis, and de-emphasis.

Figure 1A:
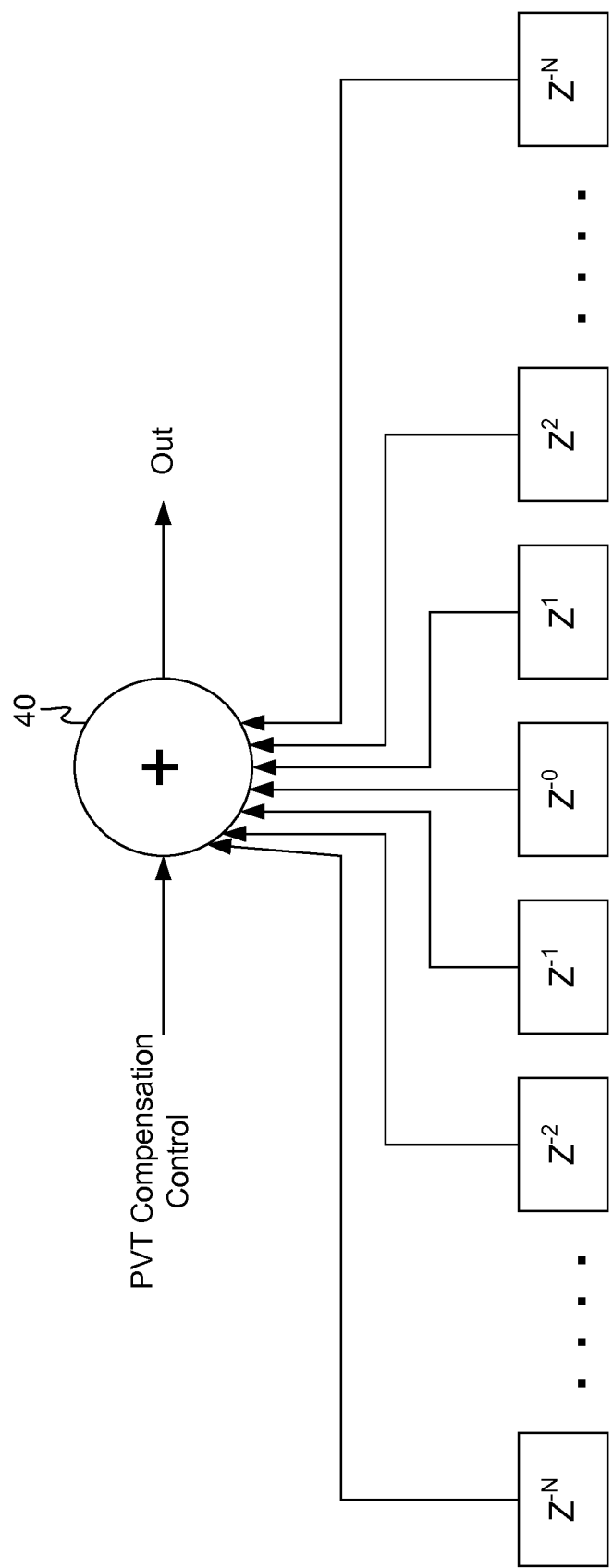
FIG. 1a illustrates a logic block implementation for a data control block of the present invention.

FIG. 1a illustrates data control block for controlling one group of unit cell drivers of the present invention. The unit cell drivers within a driver can be grouped together into several groups. Each of the groups of unit cell divers can be logically controlled by summing various data signals, pre-emphasis signals, de-emphasis signals, and other control signals for output to that group. Thus, the data signal, the pre-emphasis signals, the de-emphasis signals, and the PVT compensation control signals can be summed together to be outputted to the driver for controlling a group of unit cell drivers of the driver. The PVT compensation control signal can be used to enable and disable any of the groups or unit cell drivers. A summer 40 sums various control signals from the various flops, including $Z^{-1}, Z^{-2}, Z^{-N}, Z^{-0}, Z^1, Z^2, Z^N$, etc. The $Z^0$ flop can be for the data flop of input block 12; the $Z^{-1}, Z^{-2}$, and $Z^{-N}$ flops can be for the de-emphasis control signals; and the $Z^1, Z^2$, and $Z^N$ flop can be for the preemphasis signals.

Figure 3:
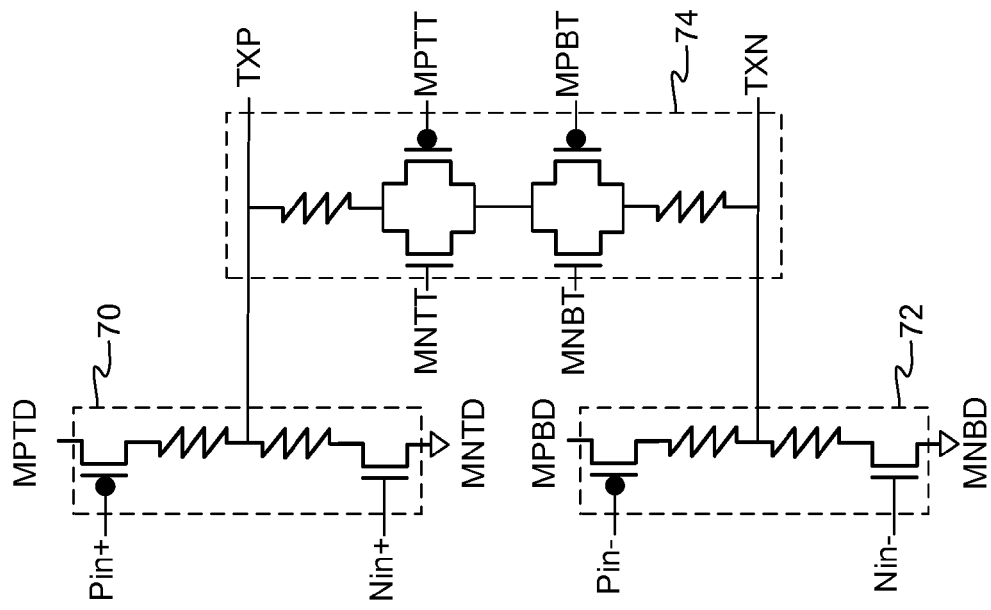
FIG. 3 illustrates a circuit diagram for a termination implementation of a unit cell driver of the present invention.
Figure 2:
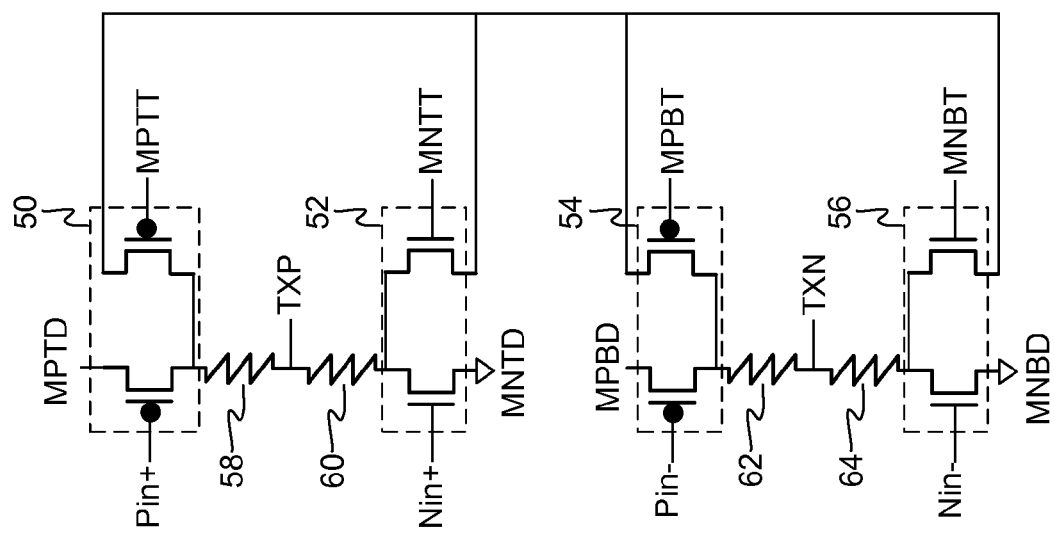
FIG. 2 illustrates a circuit diagram for a unit cell driver of the present invention having a differential mode output stage.

Circuit diagrams for various differential mode unit cell drivers of the present invention are illustrated in FIGS. 2, 3, and 4. Unit cell drivers can be optimized using resistors in a fast corner, transistor switches in a slow corner, a lowest voltage, a lowest temperature, and a 2:1 ratio between the resistors and switch resistances. In every possible other corner of the PVT, the ratio is larger than 2:1. Thus, the need for stacked transistors is eliminated. In addition, two resistors and two transistors can be utilized to eliminate large crow-bar current and slew rate control. The separation required as per the latch-up rules can also be skillfully utilized.

FIG. 2 illustrates a circuit diagram for a unit cell driver of the present invention having a differential mode output stage. A unit cell driver of the present invention comprises a first pair of interconnected PMOS transistors 50, a first pair of interconnected NMOS transistors 52, a second pair of interconnected PMOS transistors 54, a second pair of interconnected NMOS transistors 56, and four resistors 58-64. The first pair of PMOS transistors 50 and a first end of a first resistor 58 are connected. The first pair of NMOS transistors 52 and a first end of a second resistor 60 are connected, and the second end of the first resistor 58 and the second end of the second resistor 60 are connected to provide a first output TXP. The second pair of PMOS transistors 54 and a first end of a third resistor 62 are connected. The second pair of NMOS transistors 56 and a first end of a fourth resistor 64 are connected, and a second end of the third resistor 62 and a second end of the fourth resistor 64 are connected to provide a second output TXN. The first pair of PMOS transistors 50, the first pair of NMOS transistors 52, the second pair of PMOS transistors 54 and the second pair of NMOS transistors 56 are also connected.

FIG. 3 illustrates a circuit diagram for a termination implementation of a unit cell driver of the present invention. A unit cell driver of the present invention comprise a first branch 70 having a first PMOS transistor, two resistors and a first NMOS transistor connected in series; a second branch 72 having a second PMOS transistor, two resistors and a second NMOS transistor connected in series; and a third branch 74 having two resistors, a first complimentary pair of NMOS and PMOS transistors, and a second complimentary pair of NMOS and PMOS transistors connected in series. The third branch can also be referred to as am emphasis block. The first end of the third branch 74 is connected to the first branch 70 to generate a first output TXP, and the second end of the third branch 74 is connected to the second branch 72 to generate a second output TXN.

Figure 4B:
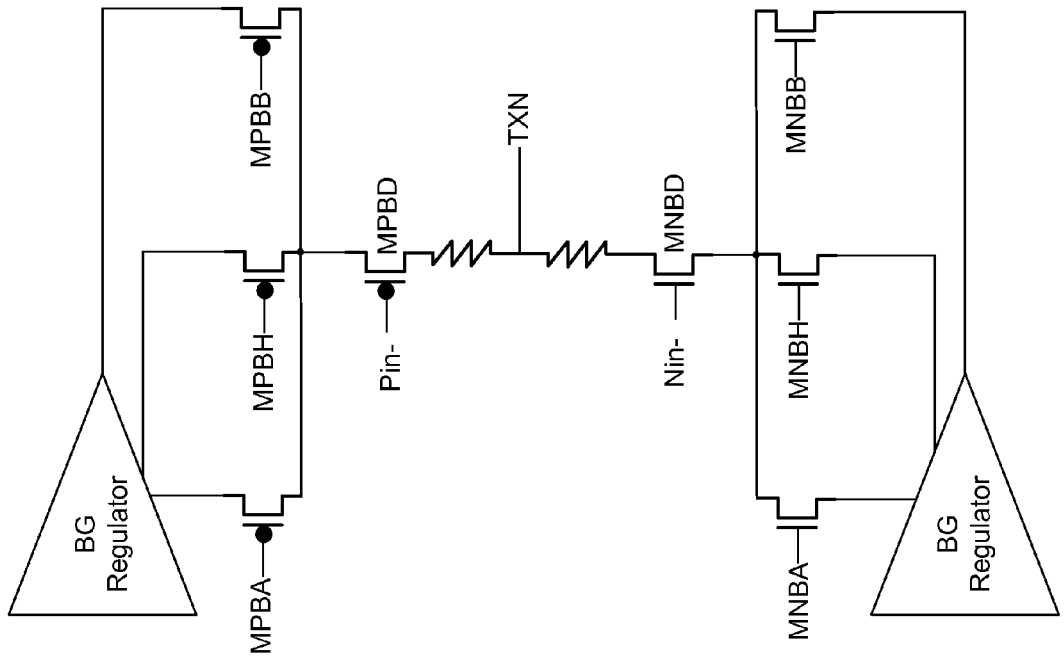
FIGS. 4a-4b illustrate a circuit diagram for a unit cell driver of the present invention comprising band-gap regulators.
Figure 4A:
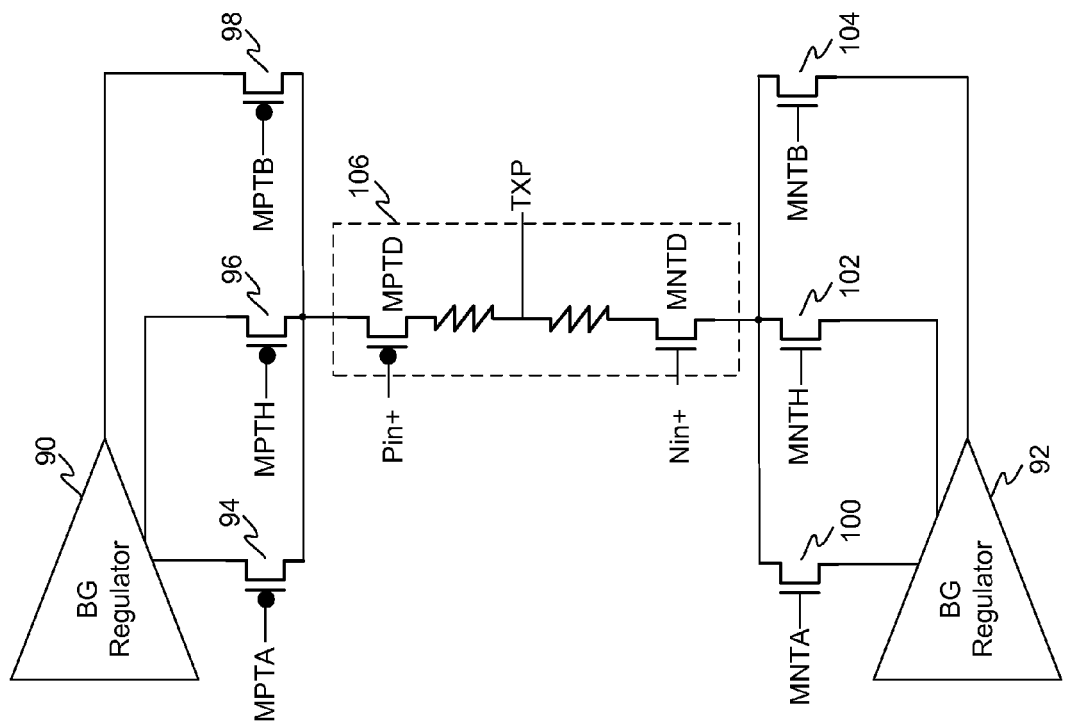

FIGS. 4a-4b illustrate circuit diagrams for a unit cell driver of the present invention comprising band-gap regulators. The circuit diagrams overlap in structural appearance to provide a first output TXP, as illustrated in FIG. 4a, and to provide a second output TXN, as illustrated in FIG. 4b. Therefore, any circuit description referring to one of these figures applies to the other figure as well. For this reason, detailed description of FIG. 4a is provided below, and is also applicable to the structure of the circuit illustrated in FIG. 4b.

Referring to FIG. 4a, a unit cell driver for a single output (e.g., either TXP or TXN) comprises band-gap ("BG") regulators 90 and 92, PMOS transistors 94-98, NMOS transistors 100-104, and a branch 106 having a PMOS transistor, two resistors, and an NMOS transistor connected in series. The BG regulator 90 provides a voltage between 0.5 v and 1 v to the PMOS transistor 94, a 1 v voltage to the PMOS transistor 96, and a voltage between 0.5 v and 1 v to the PMOS transistor 98. The PMOS transistors 94-98 are further connected to a first end of the first branch 106. The BG regulator 92 provides a voltage between 0.5 v and 1 v to the NMOS transistor 100, a 0 v voltage to the NMOS transistor 102, and a voltage between 0.5 v and 1 v to the NMOS transistor 104. The NMOS transistors 100-104 are further connected to a second end of the first branch 106. The first branch 106 can then generate the first output TXP (or the second output TXN).

FIG. 2, FIG. 3, and FIG. 4 illustrate circuit diagrams of various differential unit cell drivers of the present invention, which provide drive with various degrees of emphasis. As shown in FIG. 2 and FIG. 3, the differential inputs for transistors MPTD, MNTD, MPBD, MNBD, MPTT, MNTT, MPBT, and MNBT place the respective unit cell in a drive mode with various degrees of emphasis. For instance, whenever the differential inputs for the transistors MPTD, MNTD, MNTT, and MNBT=0 and MPBD, MNBD, MPBT, and MPTT=1, then the respective unit cell drives an output of the respective cell to a high signal; reversing the input signals force the output of the respective cell to a low signal. When MNTD, MNBD, MPTT, and MPBT=0 and MPTD, MPBD, MNBT, and MNTT=1, the unit cell is in termination mode.

Multiple unit cell drivers can be grouped together to form a driver of the present invention having multiple legs for applying PVT tuning, pre-emphasis, and de-emphasis for transmitting data signals. The outputs of the unit cell drivers can be connected together to generate the outputs TXP and TXN. For instance, the first outputs of the unit cell drivers can be connected together according to the control signals, pre-emphasis signals, and de-emphasis signal to drive a positive output of the voltage mode driver. Likewise, the second outputs of the unit cell drivers are connected together according to the control signals, pre-emphasis signals, and de-emphasis signal to drive a negative output of the voltage mode driver. Generally, a unit cell driver illustrated in FIG. 2 has lowest output capacitance due to a shared resistor, whereas a unit cell driver illustrated in FIG. 3 allows the driver to be constructed using binary weighted legs. The impedance offered by the unit leg depends on the accuracy or granularity requirements. For example, a driver with the worst case granularity of less than or equal to 1% requires 256 unit cell drivers.

A unit cell driver illustrated in FIG. 4 uses a band gap ("BG") regulator to generate different stable voltage supplies to emulate pre- and de-emphasis, rather than using a termination method. As shown in this figure, a circuit generates two voltage ranges one from 0 v to 0.5 v and other from 0.5 v to 1.0 v in steps of 20 mv. The unit cell drivers use a stack of two transistors: MPTD to put the driver in a pull-up mode; MPTH to drive 1 v on to the output; MPTA to drive a pre-emphasis voltage; and MPTB to drive a de-emphasis voltage. Similarly, the differential inputs can be used as the following: MNTD to put the driver in pull-down mode; MPTL to drive 0 v on to output; MNTA to drive pre-emphasis voltage; and MNTB to drive de-emphasis voltage. This architecture can be extended to create an N-tap driver where N is greater than or equal to 1. The operation and compensation of this unit cell can be similar to other unit cell drivers, but does not require termination, unlike the previous unit cell drivers of the present invention.

The impedance mismatch between the driver and transmission line can decrease the signal to noise ratio. The mismatch can be minimized by designing a programmable PVT compensated driver. This invention discusses various weighing techniques to create programmable PVT compensated driver using different unit cell drivers.

FIG. 5 illustrates an equally weighted driver of the present invention having unit cell drivers. Here, 256 unit cell drivers (where a single unit cell can be illustrated by the unit cell drivers shown in FIG. 2) are coupled in equal weighted fashion. This reduces the impedance spike at the output if for any reason the driver PVT compensation code changes, but requires 1536 signals (i.e., control signals TDUP[255:0], TDDN[255:0], TERP[255:0], TERN[255:0], BDUP[255:0], BDDN[255:0]) to control the driver. Thereby, the control signals drive the gate of the unit cells. For instance, in reference to the unit cell of FIG. 2, the control signal TDUP drives the transistor MPTP; the control signal TDDN drives the transistor MNTP; the controls signal TERP drives the transistor MPTT and MPBT; the control signal TERN drives the transistor MNTT and MNBT; the control signal BDUP drives the transistor MPDP; and the control signal BDDN drives the transistor MNDN The unit cell drivers can be connected in parallel and can be individually enabled or disabled by the PVT compensation, pre-emphasis, and/or de-emphasis signals.

Figure 6:
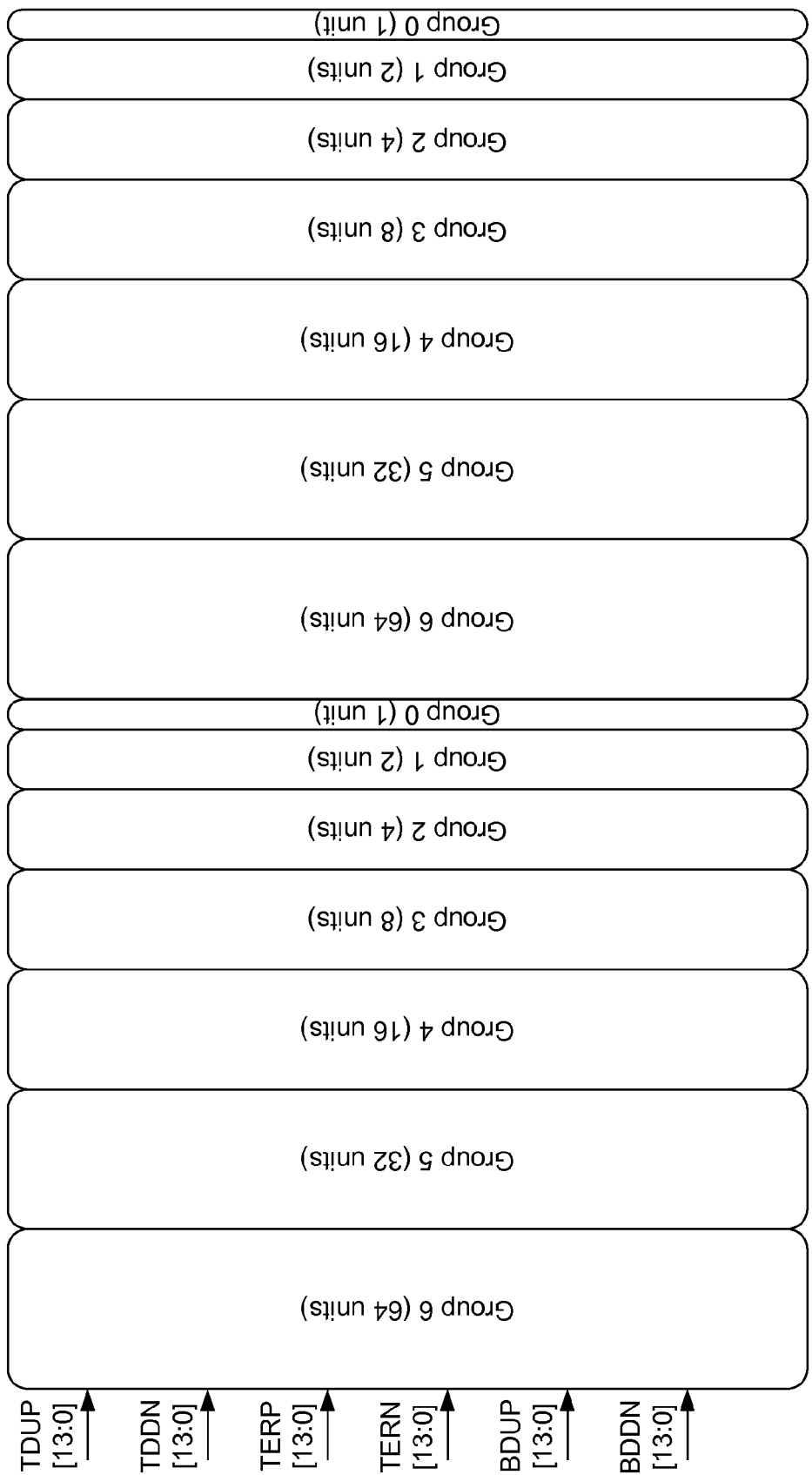
FIG. 6 illustrates a block diagram for a binary weighted driver of the present invention having unit cell drivers.

FIG. 6 illustrates a binary weighted driver of the present invention having unit cell drivers. Here, 256 unit cell drivers (also referred to as legs) are arranged in two binary weighted groups. This reduces the number of the control signals to 584 (i.e., control signals TDUP[13:0], TDDN[13:0], TERP[13:0], TERN[13:0], BDUP[13:0], BDDN[13:0]).

Figure 7:
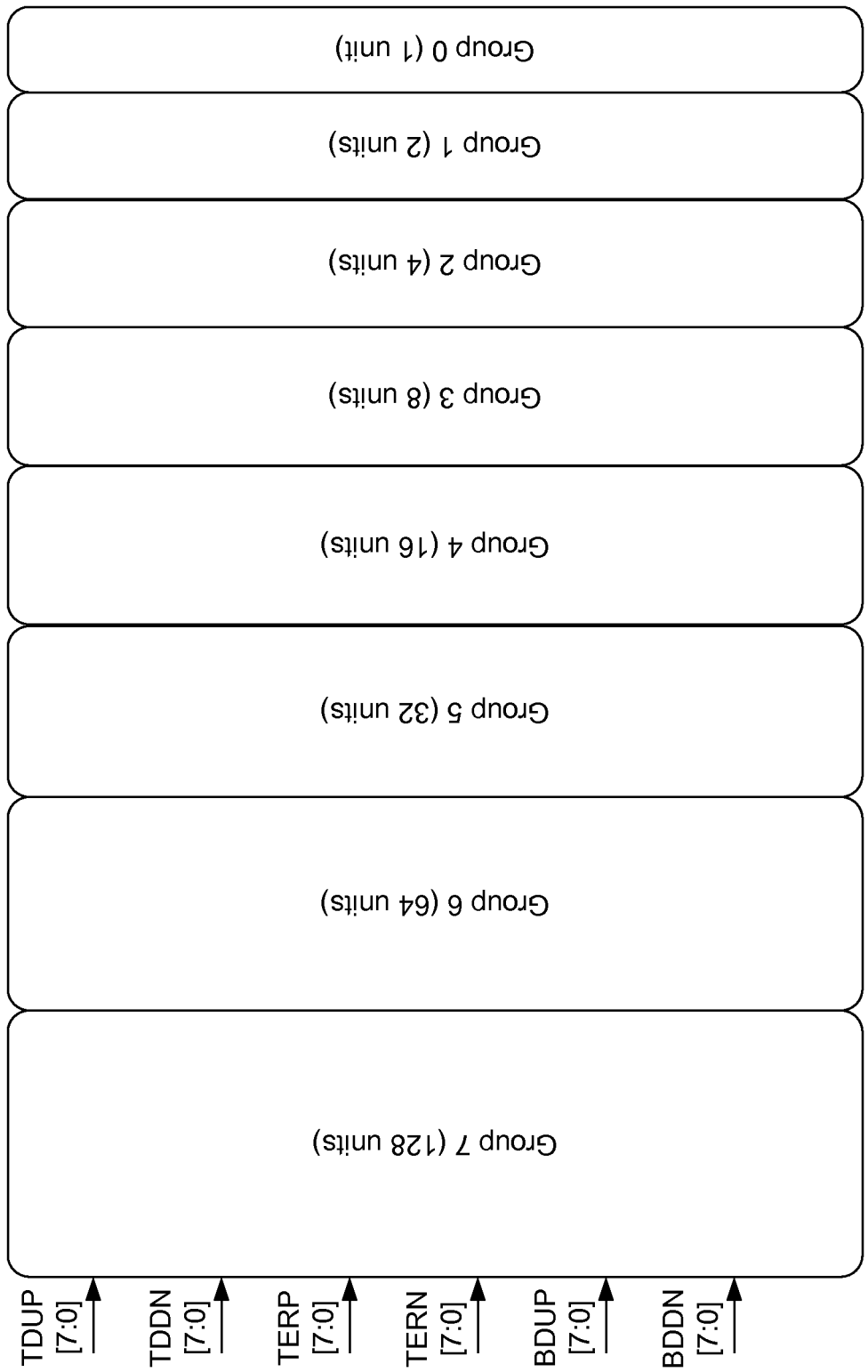
FIG. 7 illustrates a block diagram for another binary weighted driver of the present invention using unit cell drivers.

FIG. 7 illustrates another binary weighted driver of the present invention using unit cell drivers. Here, 256 unit cell drivers (where a single unit cell driver can be illustrated by the unit cell driver shown in FIG. 3) can be used in one group of binary weighted output stage. This not only brings down the number of the control signals to 48 (i.e., control signals TDUP[7:0], TDDN[7:0], TERP[7:0], TERN[7:0], BDUP[7:0], BDDN[7:0]), but also allows for the independent control of emphasis and drive. For instance, the unit cell illustrated in FIG. 3 can be constructed by two sub-cells: (1) a sub cell comprising the transistor s MPTD, MNTD, MPBD, and MNBD; and (2) a sub-cell comprising the transistors MPTT, MPBT, MNTT, and MNBT. An operational mode or design that does not require emphasis or de-emphasis can disable the second sub-cell. Thus, the emphasis portion can be easily detached from emphasis in the application where drive only is required.

Figure 8:
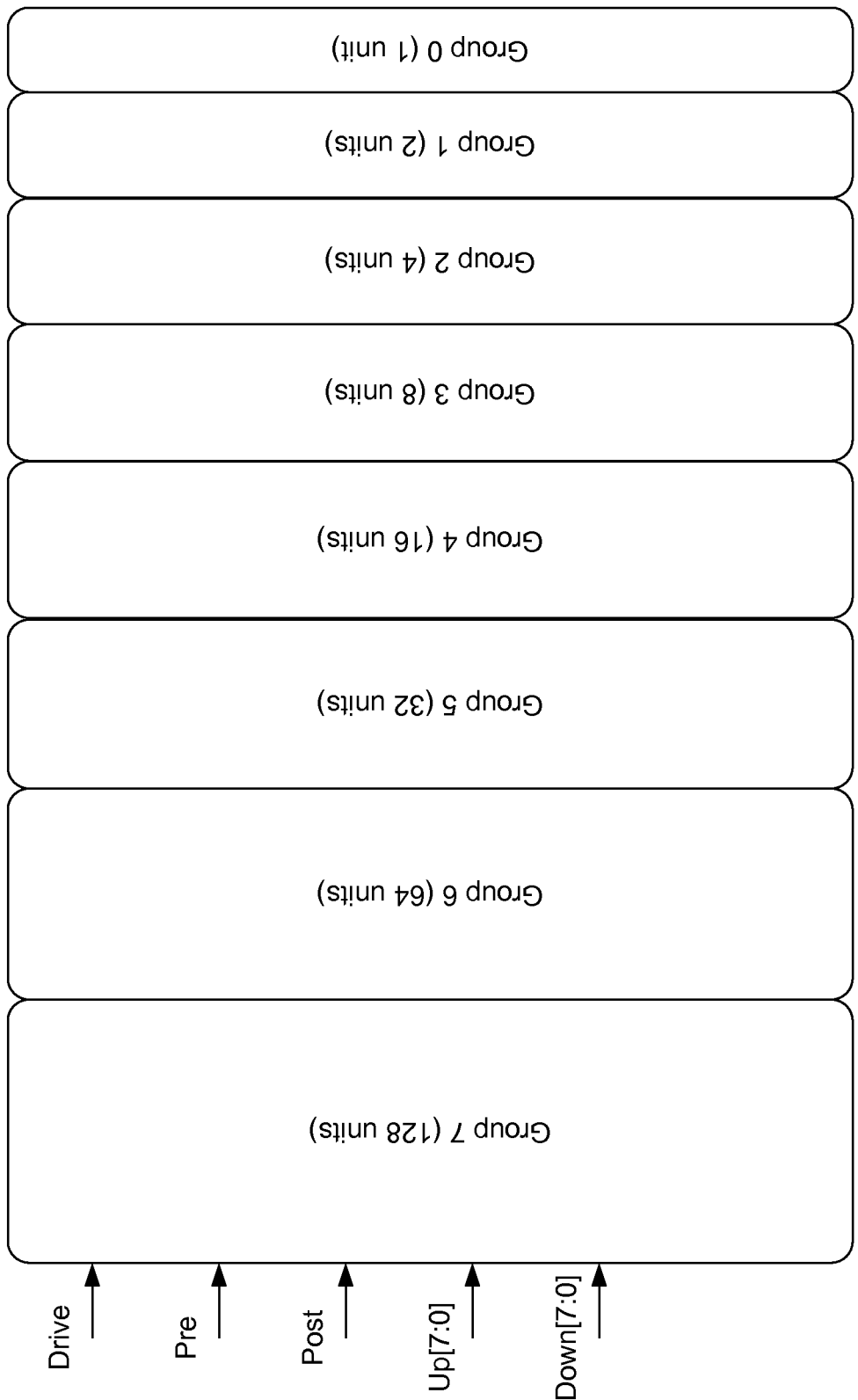
FIG. 8 illustrates a block diagram for yet another binary weighted driver of the present invention using unit cell drivers.

FIG. 8 is yet another binary weighted driver of the present invention using unit cell drivers. Here, 256 BG unit cell drivers (where a single unit cell driver can be illustrated by the unit cell driver shown in FIGS. 4a-4b) are coupled in a binary weighted fashion, which requires 50 control signals. Thereby, the control signals drive the gate of the unit cells. For instance, in reference to the unit cell of FIGS. 4a-4b, the control signal DriveUp[7:0] drives the transistors MPTA and MPBA; the control signal DriveDn[7:0] drives the transistors MNTA and MNBA; the control signal PreUp[7:0] drives the transistors MPTH and MPBH; the control signal PreDnp[7:0] drives the transistors MNTH and MNBH; the control signal PostUp[7:0] drives the transistors MPTB and MPBB; and the control signal PostDn[7:0] drives the transistors MNTB and MNBB. In addition, there can be additional two control signals Din+ and Din− for a total of 50 control signals.

Figure 9:
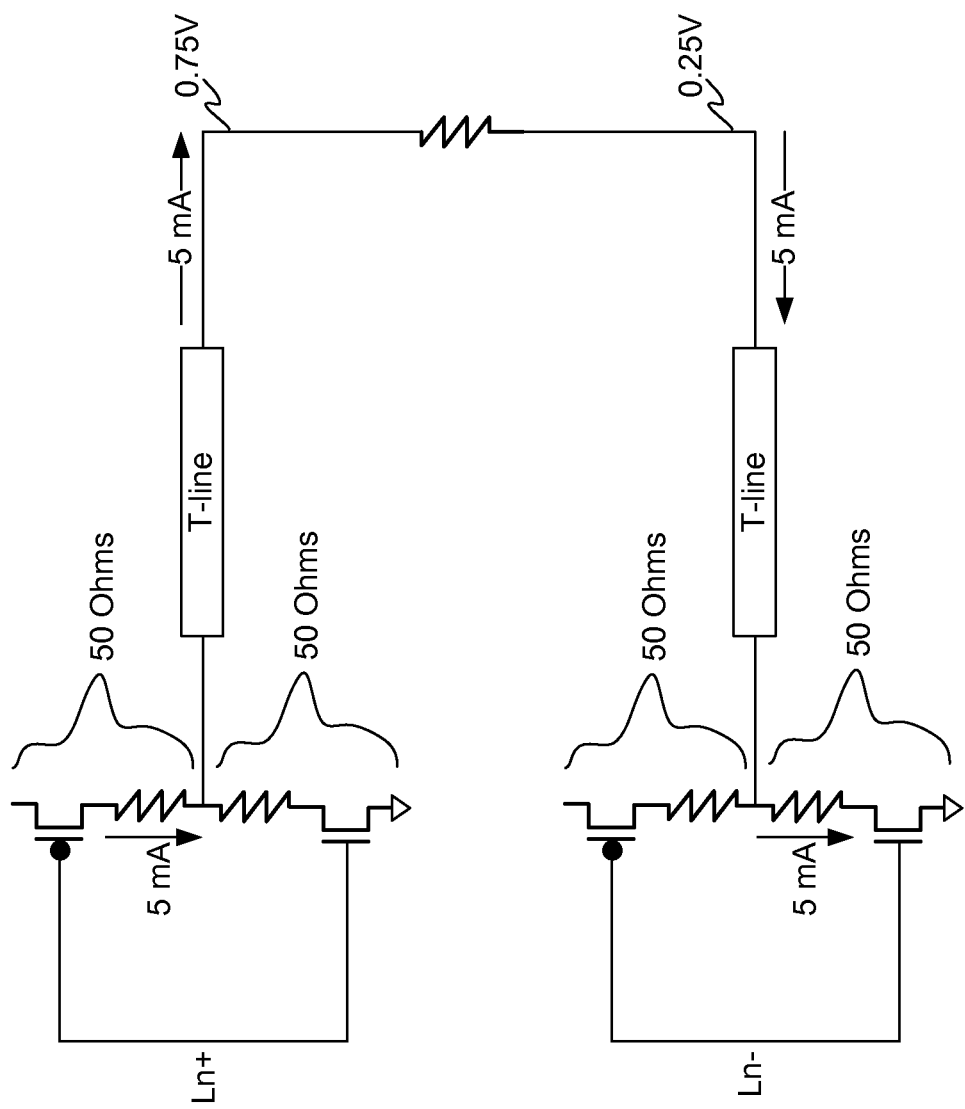
FIG. 9 illustrates a circuit diagram for a 50 ohms voltage mode driver of the present invention.

FIG. 9 illustrates a circuit diagram of a typical 50 ohms voltage mode driver of the present invention. A 1 v, 50 ohm voltage mode driver of the present invention with 128 unit cell drivers enabled in drive mode can consume around 5 mA. Thus, every unit cell driver offers an impedance of around 6.4K ohms or consumes 39 micro amps.

Figure 10:
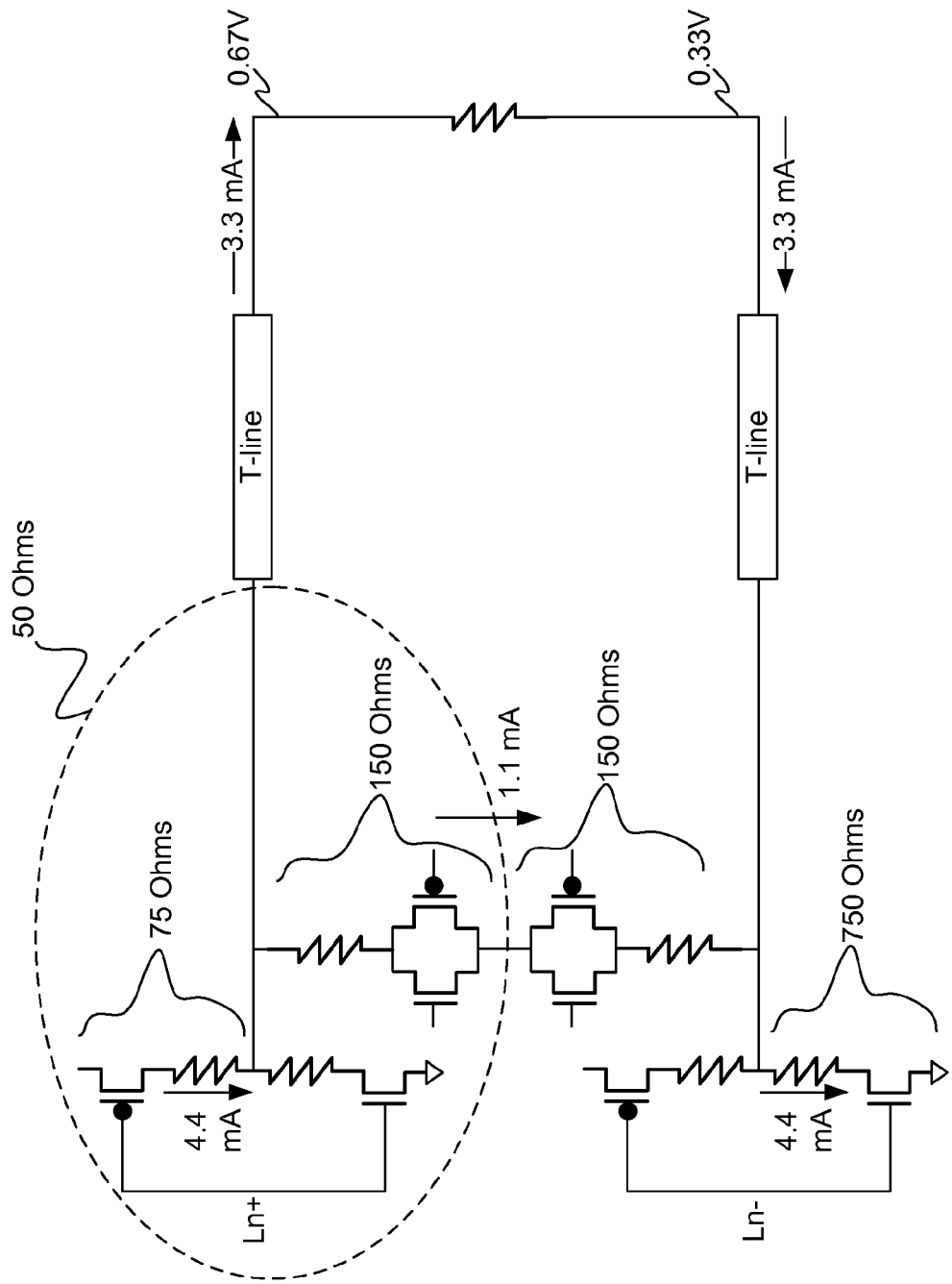
FIG. 10 illustrates a circuit diagram for a voltage mode driver of the present invention with an impedance of 50 ohms and emphasis of −80 mv.

FIG. 10 illustrates a circuit diagram of a voltage mode driver of the present invention with an impedance of 50 ohms and emphasis of −80 mv. The pre/de-emphasis of 80 mv requires a drive of 75 ohms and a termination of 150 ohms. This requires a driver to shut off ⅓ the number of legs and a termination of ⅓ the number of legs. This can simplify the emphasis design to a large extent. Furthermore, the current through the driver decreases from 5 mA to 4.4 mA which reduces the overall transmitter power.

Figure 11B:
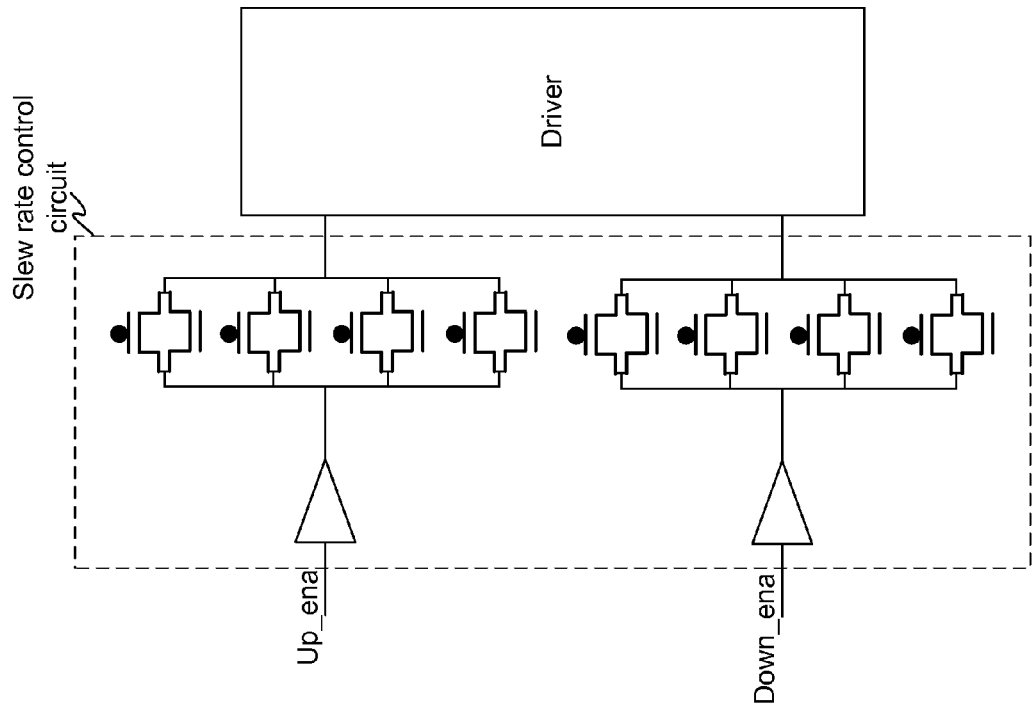
FIGS. 11a, 11b, and 11c illustrate different slew rate control circuits.
Figure 11A:
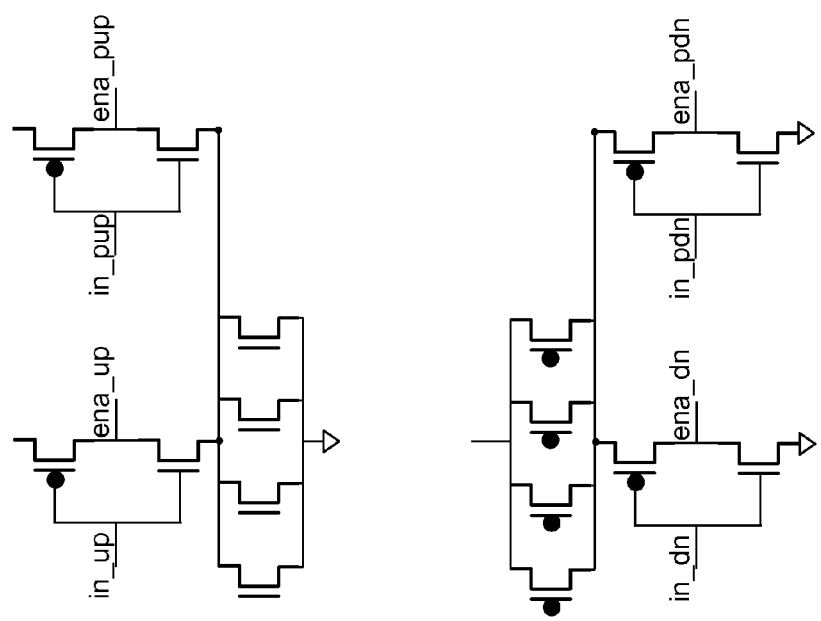
Figure 11C:
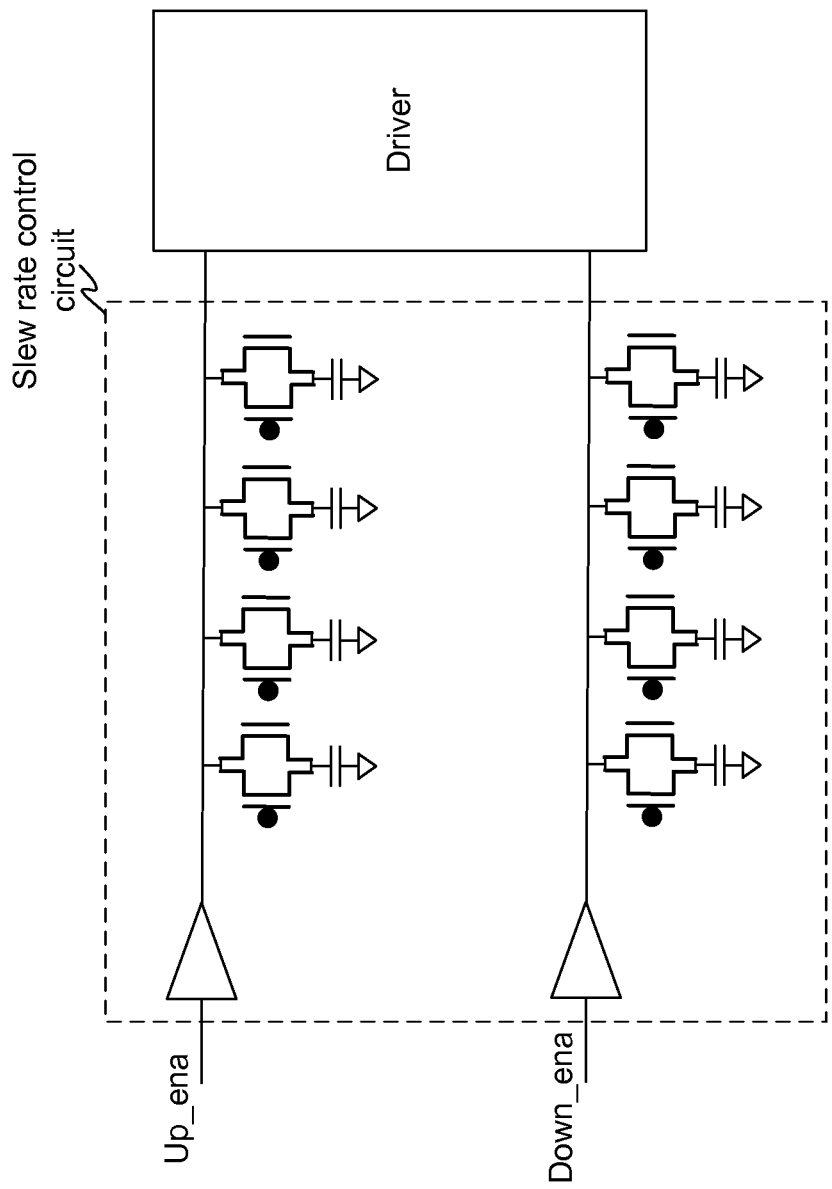

FIGS. 11a, 11b, and 11c illustrate different slew rate control circuits that can be used in conjunction with the present invention to provide slew rate control. FIG. 11a, illustrates a slew rate control circuit that controls the slew rate by changing a rise or fall path resistance. FIG. 11b illustrates another slew rate control circuit that changes resistance in both the rise and fall paths. FIG. 11c illustrates a slew rate control circuit that changes capacitance in the rise and fall paths. Since the design of a base leg for slew rate control is the same as a driver, a similar technique can be used in slew rate design. In addition, the ratio between resistor and top switch can be changed from 2:1 to 4:1. This can make it less dependent on temperature and voltage and does not require expensive compensation techniques.

Figure 12:
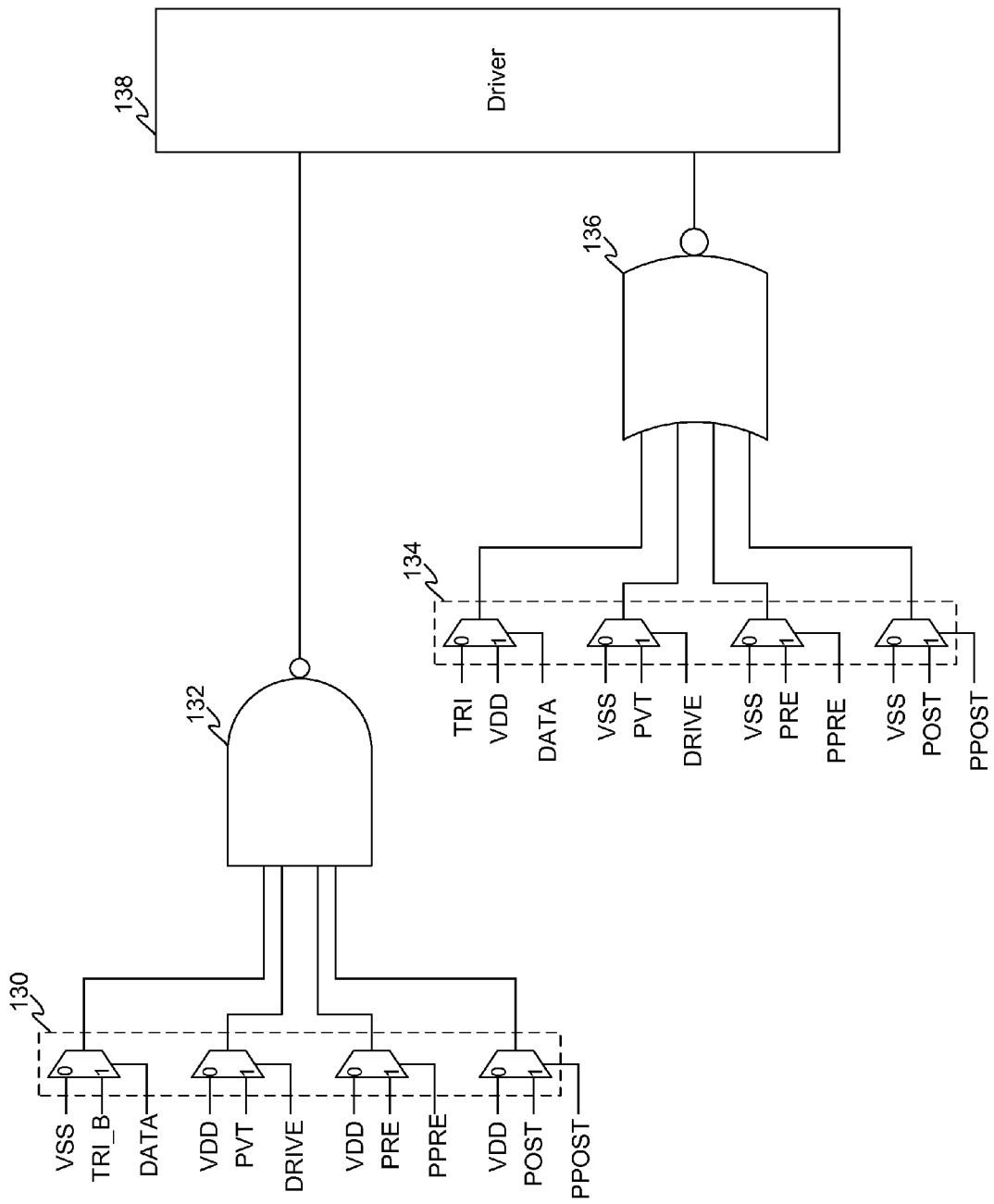
FIG. 12 illustrates a circuit diagram for an n-tap data control block of the present invention.

FIG. 12 illustrates a circuit diagram of an n-tap data control block of the present invention. A data control block of the present invention comprises multiplexers 130 and 134, a pull-up circuit (e.g., a NAND gate 132), and a pull down circuit (e.g., a NOR gate 136). The data control block can be connected to a unit cell driver 138. The control signals DATA, DRIVE, PPRE, and PPOST select which input of the respective multiplexers 130 and 134 to pass to the NAND gate 132 and the NOR gate 136.

Generally, the data control block is capable of being an N-tap driver with a few number of flops and circuitry. The number of flops required can be equal to N+1, where N is a number of taps. The number of multiplexers ("MUX's") for the data control block can be equal to N+1, where one of the multiplexers forces the respective unit cell driver to a tri-state.

The data control block drives low on to pull-up, if the driver is not tri-stated, i.e., data is high and PVT, pre-emphasis, or de-emphasis is enabled. Similarly, the data control block drives high on to pull-down, if (1) the driver 138 is not tri-stated; (2) PVT, pre-emphasis, or de-emphasis is enabled; and (3) the data is low. In all other cases, the driver 138 is driven high on to pull-up, and low on to pull-down. This circuit gives equal delay from data, pre and de-emphasis flops to the input of final driver with fewer gates. Global tri-state signals can be controlled by the controller.

Therefore, the voltage at an output of the driver 138 is high or low according to the following equations:

$$\text{HIGH} = \text{TRI\_}B \& \text{DATA} \& ((\text{DRIVE} \& \text{PVT}) | (\text{PRE} \& P\text{PRE}) | (\text{POST} \& P\text{POST})) \quad (1)$$

$$\text{LOW} = \text{TRI} | \sim\text{DATA} | ((\sim\text{DRIVE} | \sim\text{PVT}) \& (\sim\text{PRE} | \sim P\text{PRE}) | (\text{POST} | \sim P\text{POST}) \quad (2)$$

TRI = all other conditions not covered by Eq. (1) and Eq. (2). (3)

FIGS. 13a and 13b illustrate graphical representations of noise induced from adjacent switching channels. Switching channels can induce a glitch on a stationary channel or can cause the cross over to push out. The direction and magnitude of the glitch depends on an aggressor slew rate, a coupling to channel capacitance ratio, and a victim driver impedance. Once the channel is designed, it can be very difficult to use static techniques to compensate for the noise since it is data dependent. Compensation techniques would need to know the data on the adjacent channel and a magnitude of the compensation required, which means the compensation logic should be able to read the aggressor data and adjust the amount and direction of compensation in the affected channel.

Referring to FIG. 13a, adjacent channels 1, 2, and 3 drive differential outputs 150, 152, and 154 respectively. The graph 160 shows the differential outputs 150-154 side-by-side along a time axis. Due to switching of differential outputs 150 and 154 of the adjacent channels 1 and 3, the differential output 152 for channel 2 is distorted at glitch 162.

Referring to FIG. 13b, the output 154 for channel 3 is stationary while the output 150 is switching for channel 1. The switching channel 1 causes a glitch 166, as illustrated in the graph 164 of the differential outputs 150-154, plotted side-by-side along the time axis.

Figure 14:
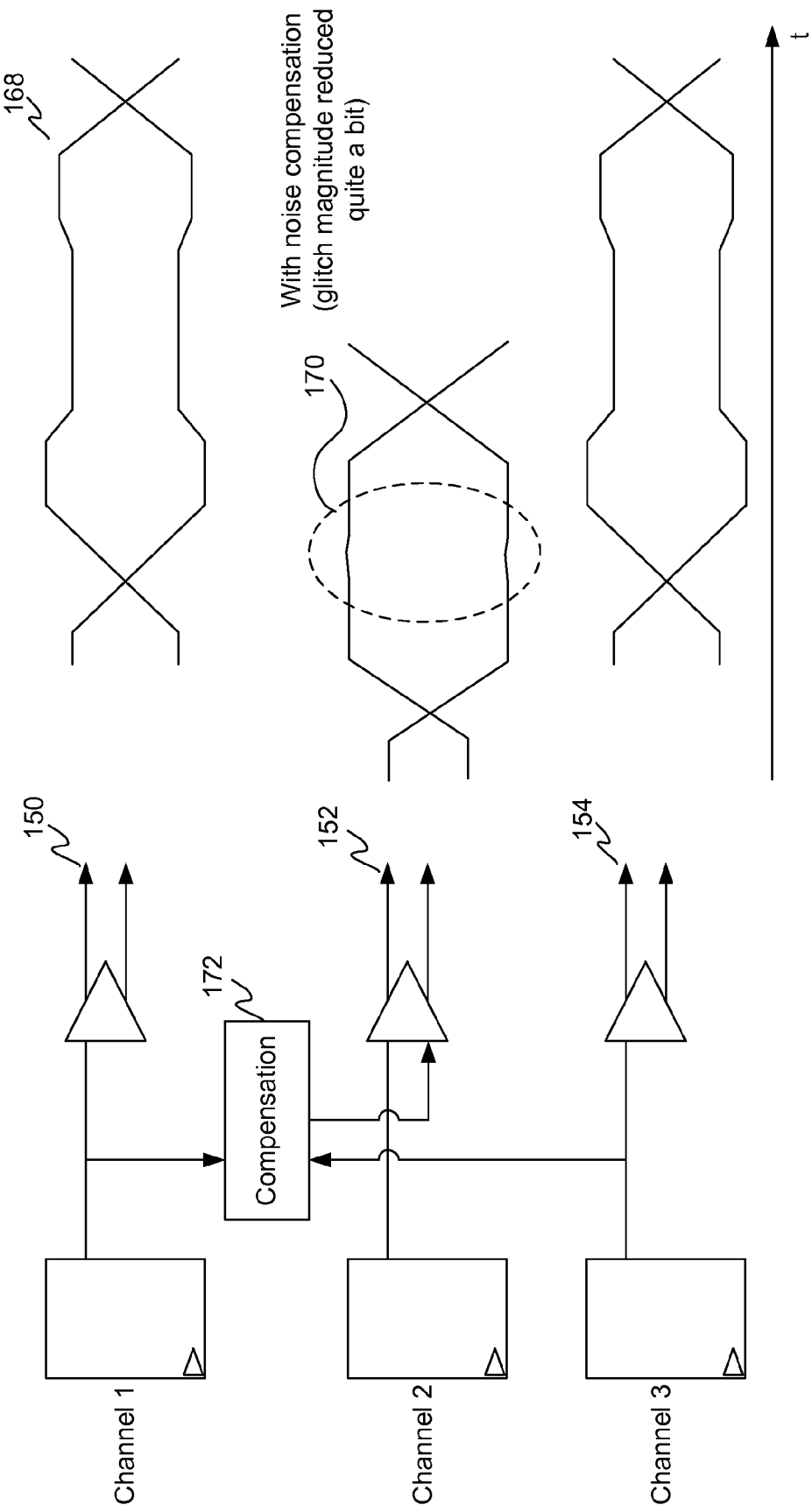
FIG. 14 illustrates graphical representations of the results of a noise compensation method of the present invention to adjust an emphasis setting for a given channel.

FIG. 14 illustrates graphical representations of the results of a noise compensation method of the present invention to adjust an emphasis setting for a given channel. A noise cancellation method of the present invention can adjust an emphasis setting for a given channel using a driver of the present invention to reduce or eliminate any glitches caused by one or more switching adjacent channels.

Since the data pattern is known in advance and a driver of the present invention supports n-taps with little design change, noise cancellation can be performed. Based on channel characteristics, the amount and direction of coupling required can be programmed to a channel driver via a compensation block 172. The data transmitted by Channel 1 and Channel 3 can be read by the compensation block 172. The compensation block 172 can then adjust the respective driver for channel 2 to adjust the differential output 152 to account for the adjacent switching channels and other distortions to the signal.

For example, channel 1's output TXN can couple to channel 2's output TXP. If channel 2 is stationary and channel 1 is driven high, this would introduce a negative glitch of M-mv. Similarly a low driving channel 1 would introduce a positive glitch. In this case, the direction can be programmed (1) as negative and magnitude of compensation as M-mv, or (2) to remove N-compensation legs and add N-emphasis legs. This would ensure constant impedance of the driver and compensate for the glitch.

The graph 168 illustrates the compensated differential outputs 150-154 plotted side-by-side along a time axis. Due to compensation, channel 2 suffers a glitch 170 that is greatly reduced even though the differential outputs of adjacent channels 1 and 3 are switching.

Figure 15A:
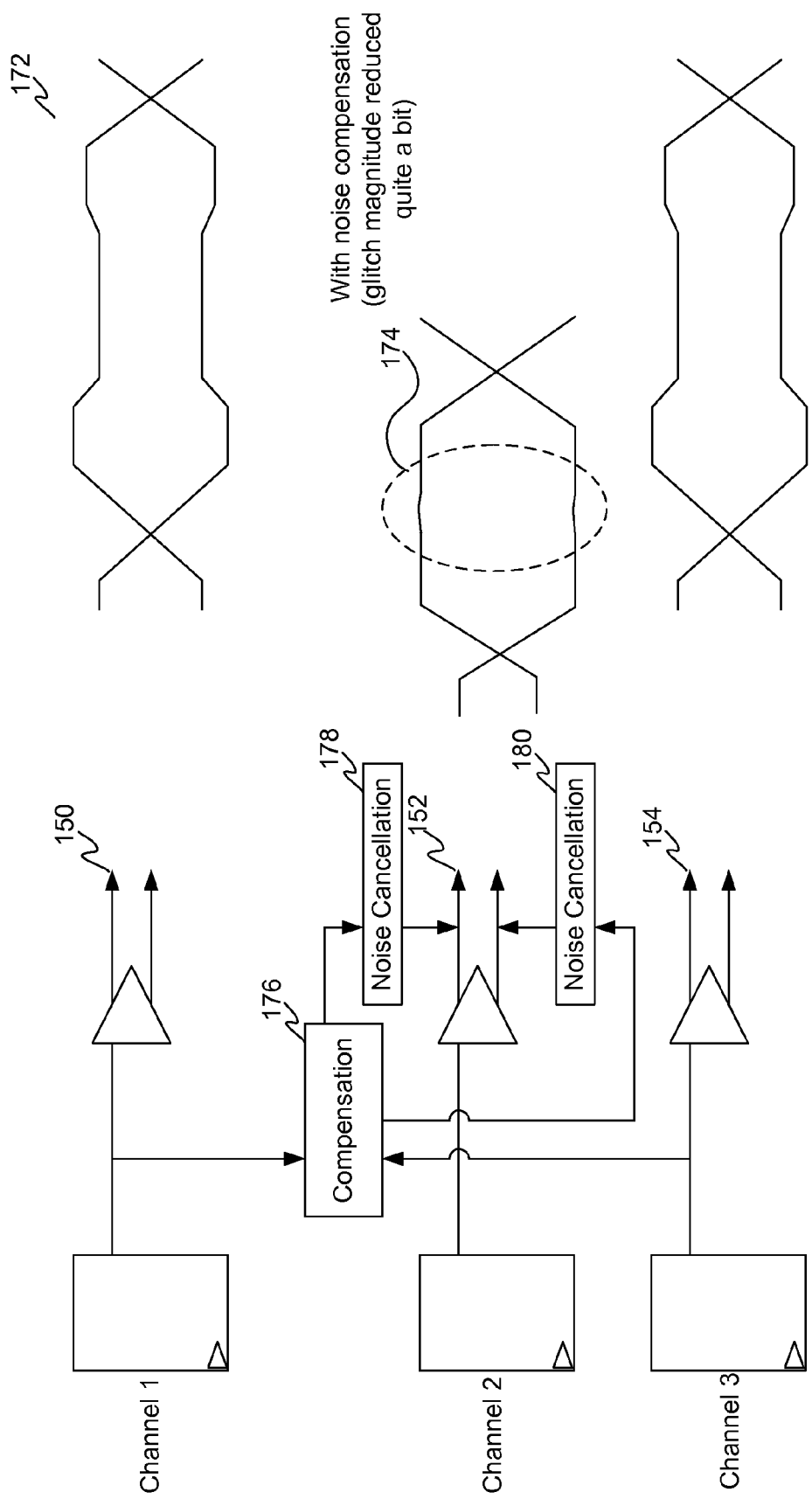
FIG. 15a illustrates graphical representations of the results of another noise cancellation method of the present invention to adjust an emphasis setting for a given channel.
Figure 15B:
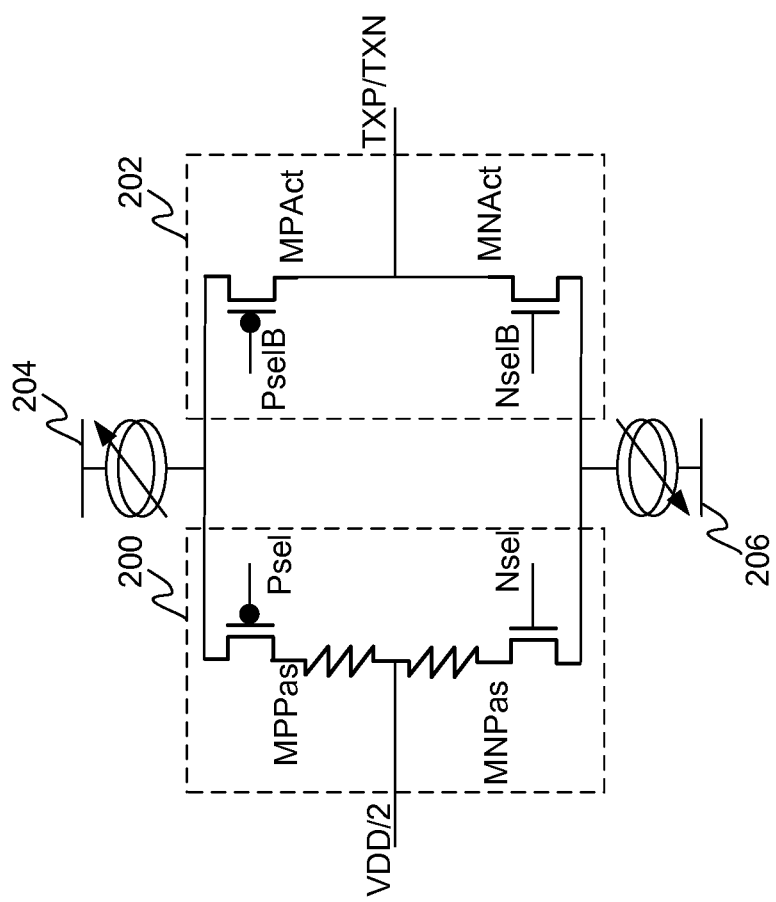
FIG. 15b illustrates a circuit diagram for a LVDS driver of the present invention.

FIGS. 15a and 15b illustrate graphical representations of the results of another noise cancellation method of the present invention to adjust an emphasis setting for a given channel. FIG. 15a illustrates various adjacent channels and an associated differential output graph for those channels. Alternate noise compensation methods of the present invention can also be implemented without changing the driver compensation legs. First, a user can program the amount of compensation required for high and low signals by changing the current source settings. For instance, when no compensation is required on pull-up, a noise compensation block 176 can force 0 onto Psel and 1 onto PselB of the noise cancellation blocks 178 and 180, and similarly 1 onto Nsel and 0 onto NselB of the noise cancellation blocks 178 and 180.

Noise compensation can continuously monitor the data on adjacent channels and enable the appropriate Psel/PselB or Nsel/NselB signals. This method would not require any changes to the normal driver operation and ensures required pre-defined impedance at the output. It would also keep the current sources in saturation by using differential current sources.

A graph 172 illustrates the compensated differential outputs 150-154 for channels 1-3 plotted side-by-side along a time axis. Due to compensation, channel 2 suffers a glitch 174 that is significantly reduced.

FIG. 15b illustrates a circuit for a LVDS driver of the present invention. A low voltage differential signaling (LVDS) driver of the present invention can comprise two branches 200 and 202 connected in parallel across current sources 204 and 206. The first branch 200 comprises a PMOS transistor, two resistors, and an NMOS transistor connected in series. The second branch 202 also comprises a PMOS transistor, two resistors, and an NMOS transistor connected in series. The Psel control signal controls the gate of the PMOS transistor of the first branch 200 and the PselB control signal controls the gate of the PMOS transistor of the second branch 202. The Nsel control signal controls the gate of the NMOS transistor of the first branch 200 and the NselB control signal controls the gate of the NMOS transistor of the second branch 202. The voltage VDD divided by 2 can be applied on the first branch 200, while an output (e.g., the output TXP or the output TXN) is provided by the second branch 202.

Figure 16:
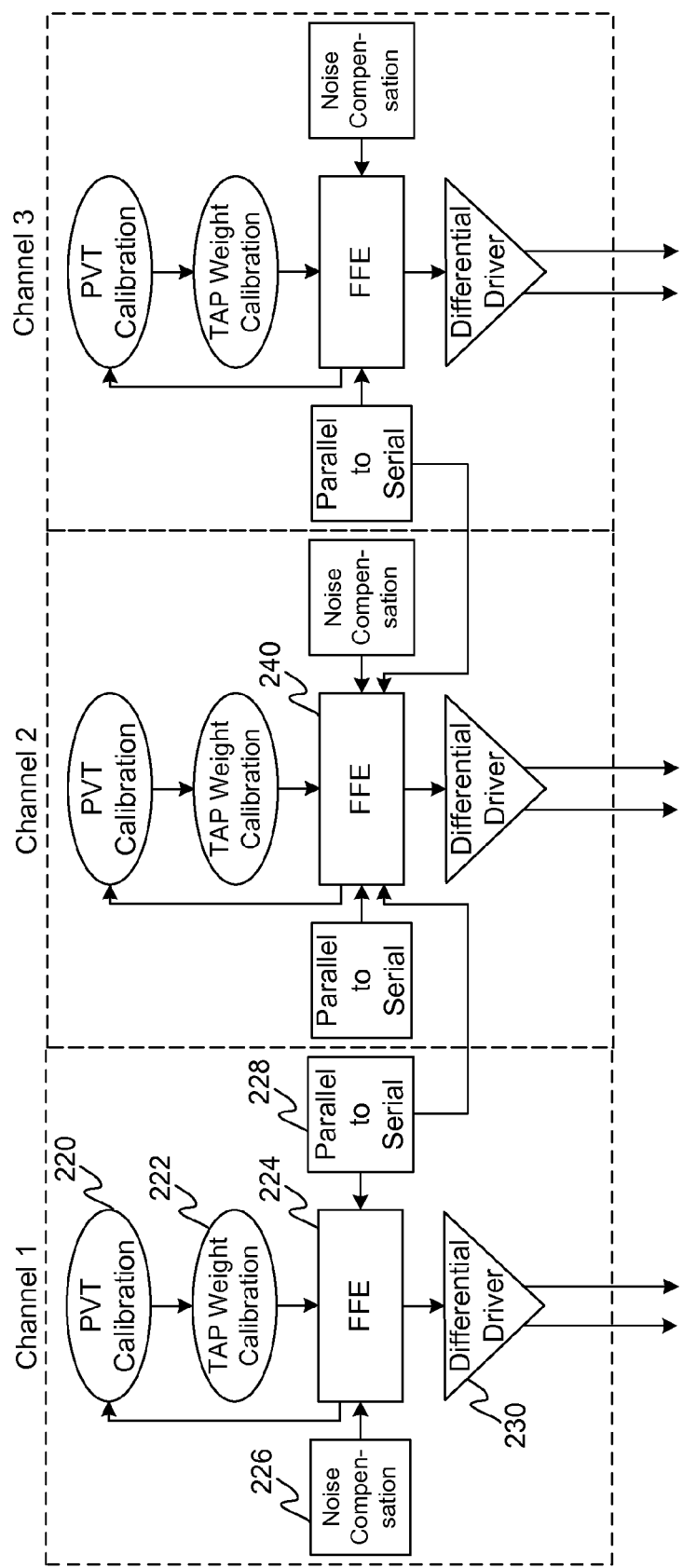
FIG. 16 illustrates a flow diagram for noise compensation and PVT calibration of the present invention for several channels.

FIG. 16 illustrates a compensation and data flow diagram of the present invention for several channels. Here, channels 1, 2, and 3 are used as an example to illustrate a compensation flow chart of the present invention. However, it can be understood by a person having ordinary skill in the art that such circuits, flow charts, and circuit diagrams of the present invention can be used for any number of channels. Therefore, the present invention can be applied to multiple channels.

Referring to FIG. 16, the differential output for channel operation can be divided into the following two phases: (1) a phase for training, compensation calculation, and calibration; and (2) a normal operation phase. During the first phase, a driver for the respective channel can be PVT calibrated 220 for desired output impedance. This will determine the maximum number legs that should be enabled to get a desired impedance. For instance, in the case above for a 50 ohms impedance, the total weight is equal to 1. Next, the driver calibrates/calculates/trains 222 different tap weights. Once the PVT legs and tap weight in terms of legs are determined, this will be fed to a feed forward equalization ("FFE") block 224 along with the noise compensation information 226. During the second phase (or normal operation), the FFE 224 reads the PVT compensation information, tap weights, and noise compensation to apply these information to serial data from a parallel-to-serial serializer block 228, before being inputted to a final differential driver 230 for differential output.

If there is an adjacent channel (e.g., channel 2), the serial data from the parallel-to-serial serializer block 228 of channel 1 is inputted to the FEE 240 of channel 2 so that channel 2 can apply noise cancellation techniques of the present invention for its differential output. Likewise, any other data form additional adjacent channels can be inputted into the FFE 240 so that channel 2 can account for any adjacent channel switching. For instance, the parallel-to-serial serializer 260 of channel 3 inputs the data for channel 3 to the FFE 240 of channel 2 for calibration and noise reduction for the differential outputs of Channel 2.

While the present invention has been described with reference to certain preferred embodiments or methods, it is to be understood that the present invention is not limited to such specific embodiments or methods. Rather, it is the inventor's contention that the invention be understood and construed in its broadest meaning as reflected by the following claims. Thus, these claims are to be understood as incorporating not only the preferred methods described herein but all those other and further alterations and modifications as would be apparent to those of ordinary skilled in the art.

I claim:

1. A driver, comprising,
    an input block for receiving one or more data signals and one or more control signals;
    a data control block for processing said data signals and said control signals to determine one or more modified control signals, wherein said modified control signal is determined as a function of one or more de-emphasis signals, one or more pre-emphasis signals, and the control signals, wherein said data control block comprises a first set of multiplexers, a second set of multiplexers, a pull-up circuit, and a pull-down circuit, wherein inputs of the first set of multiplexers are selected for output as a function of the data signals and the control signals, wherein outputs of the first set of multiplexers are inputted to the pull-up circuit, wherein inputs of the second set of multiplexers are selected for output as a function of the data signals and the control signals, and wherein outputs of the second set of multiplexers are inputted to the pull-down circuit; and
    a driver block for receiving said modified control signals and generating one or more output data signals.

2. The voltage mode driver of claim 1 wherein said pull-up circuit receives the one or more de-emphasis signals, the one or more pre-emphasis signals, the data signals, and the control signals.

3. The voltage mode driver of claim 2 wherein said pull-up circuit is a NAND gate.

4. The voltage mode driver of claim 1 wherein said pull-down circuit receives the one or more de-emphasis signals, the one or more pre-emphasis signals, the data signals and the control signals.

5. The voltage mode driver of claim 4 wherein said pull-down circuit is a NOR gate.

6. The voltage mode driver of claim 1 wherein the driver block comprises a plurality of unit cell drivers and wherein each of said unit cell drivers are selectively enabled and disabled as a function of the de-emphasis signals, the pre-emphasis signals, and the control signals.

7. The voltage mode driver of claim 6 wherein each of the unit cell drivers has an emphasis block.

8. The voltage mode driver of claim 7 wherein the driver block can operate in a process-voltage-temperature ("PVT") tuning mode where selected ones of the unit cell drivers are enabled and the emphasis blocks are disabled, or in an emphasis mode where the unit cell drivers are disabled and the emphasis blocks are enabled.

9. The voltage mode driver of claim 6 wherein the unit cell drivers are partitioned into binary weighted groups and wherein one or more certain ones of the groups are enabled and other ones of the groups are disabled as a function of the de-emphasis signals, the pre-emphasis signals, and the control signals.

10. The voltage mode driver of claim 6 wherein each of the unit cell drivers comprise,
- a first pair of interconnected NMOS transistors;
- a first pair of interconnected PMOS transistors;
- a second pair of interconnected NMOS transistors;
- a second pair of interconnected PMOS transistors; and
- four resistors,
- wherein the first pair of NMOS transistors and a first end of a first resistor are connected,
- wherein the first pair of PMOS transistors and a first end of a second resistor are connected,
- wherein the second end of the first resistor and the second end of the second resistor are connected to provide a first output,
- wherein the second pair of NMOS transistors and a first end of a third resistor are connected,
- wherein the second pair of PMOS transistors and a first end of a fourth resistor are connected,
- wherein the first pair of NMOS transistors, the first pair of PMOS transistors, the second pair of NMOS transistors and the second pair of PMOS transistors are connected, and
- wherein a second end of the third resistor and a second end of the fourth resistor are connected to provide a second output,
- wherein the first outputs of the unit cell drivers are connected in parallel to drive a positive output of the voltage mode driver, and
- wherein the second outputs of the unit cell drivers are connected in parallel to drive a negative output of the voltage mode driver.

11. The voltage mode driver of claim 6 wherein each of the unit cell drivers comprise,
- a first branch having a first NMOS transistor, two resistors and a first PMOS transistor connected in series;
- a second branch having a second NMOS transistor, two resistors and a second PMOS transistor connected in series; and
- a third branch having two resistors, a first complimentary pair of NMOS and PMOS transistors, and a second complimentary pair of NMOS and PMOS transistors connected in series,
- wherein a first end of the third branch is connected to the first branch to generate a first output, and
- wherein a second end of the third branch is connected to the second branch to generate a second output.

12. The voltage mode driver of claim 6 wherein each of the unit cell drivers comprises one or more band gap regulators for generating an output.

13. The voltage mode driver of claim 1 further comprising a compensation block, wherein a first driver is adjacent to a second driver and wherein the first driver and the second driver are coupled to each other, and wherein upon switching the one or more outputs of the first driver, the compensation block adjusts one or more outputs of the second driver to compensate for a glitch caused by the first driver.

14. The voltage mode driver of claim 1 wherein the first set of multiplexers comprises a first multiplexer controlled by a data signal, a second multiplexer controlled by a drive signal, a third multiplexer controlled by a pre-emphasis signal, and a fourth multiplexer controlled by a de-emphasis signal.

15. The voltage mode driver of claim 1 wherein the second set of multiplexers comprises a fifth multiplexer controlled by a data signal, a sixth multiplexer controlled by a drive signal, a seventh multiplexer controlled by a pre-emphasis signal, and an eighth multiplexer controlled by a de-emphasis signal.

16. A driver, comprising,
- an input block for receiving one or more data signals and one or more control signals;
- a data control block for processing said data signals and said control signals to determine one or more modified control signals, wherein said modified control signal is determined as a function of one or more de-emphasis signals, one or more pre-emphasis signals, and the control signals, wherein said data control block comprises a first set of multiplexers, a second set of multiplexers, a pull-up circuit, and a pull-down circuit, wherein inputs of the first set of multiplexers are selected for output as a function of the data signals and the control signals, wherein outputs of the first set of multiplexers are inputted to the pull-up circuit, wherein inputs of the second set of multiplexers are selected for output as a function of the data signals and the control signals, wherein outputs of the second set of multiplexers are inputted to the pull-down circuit, wherein the first set of multiplexers comprises a first multiplexer controlled by a data signal, a second multiplexer controlled by a drive signal, a third multiplexer controlled by a pre-emphasis signal, and a fourth multiplexer controlled by a de-emphasis signal, and wherein the second set of multiplexers comprises a fifth multiplexer controlled by a data signal, a sixth multiplexer controlled by a drive signal, a seventh multiplexer controlled by a pre-emphasis signal, and an eighth multiplexer controlled by a de-emphasis signal; and
- a driver block for receiving said modified control signals and generating one or more output data signals,
- wherein said pull-up circuit receives the one or more de-emphasis signals, the one or more pre-emphasis signals, the data signals, and the control signals,
- wherein said pull-up circuit is a NAND gate,
- wherein said pull-down circuit receives the one or more de-emphasis signals, the one or more pre-emphasis signals, the data signals and the control signals,
- wherein said pull-down circuit is a NOR gate,
- wherein the driver block comprises a plurality of unit cell drivers,
- wherein each of said unit cell drivers are selectively enabled and disabled as a function of the de-emphasis signals, the pre-emphasis signals, and the control signals,
- wherein each of the unit cell drivers has an emphasis block, wherein the driver block can operate in a process-voltage-temperature ("PVT") tuning mode where selected ones of the unit cell drivers are enabled and the emphasis blocks are disabled, or in an emphasis mode where the unit cell drivers are disabled and the emphasis blocks are enabled, wherein the unit cell drivers are partitioned into binary weighted groups, and wherein one or more certain ones of the groups are enabled and other ones of the groups are disabled as a function of the de-emphasis signals, the pre-emphasis signals, and the control signals.

17. The voltage mode driver of claim 16 further comprising a compensation block, wherein a first driver is adjacent to a second driver and wherein the first driver and the second driver are coupled to each other, and wherein upon switching the one or more outputs of the first driver, the compensation block adjusts one or more outputs of the second driver to compensate for a glitch caused by the first driver.

18. The voltage mode driver of claim 16 wherein each of the unit cell drivers comprise,
   a first pair of interconnected NMOS transistors;
   a first pair of interconnected PMOS transistors;
   a second pair of interconnected NMOS transistors;
   a second pair of interconnected PMOS transistors; and
   four resistors,
   wherein the first pair of NMOS transistors and a first end of a first resistor are connected,
   wherein the first pair of PMOS transistors and a first end of a second resistor are connected,
   wherein the second end of the first resistor and the second end of the second resistor are connected to provide a first output,
   wherein the second pair of NMOS transistors and a first end of a third resistor are connected,
   wherein the second pair of PMOS transistors and a first end of a fourth resistor are connected,
   wherein the first pair of NMOS transistors, the first pair of PMOS transistors, the second pair of NMOS transistors and the second pair of PMOS transistors are connected,
   wherein a second end of the third resistor and a second end of the fourth resistor are connected to provide a second output,
   wherein the first outputs of the unit cell drivers are connected in parallel to drive a positive output of the voltage mode driver, and
   wherein the second outputs of the unit cell drivers are connected in parallel to drive a negative output of the voltage mode driver.

19. The voltage mode driver of claim 16 wherein each of the unit cell drivers comprise,
   a first branch having a first NMOS transistor, two resistors and a first PMOS transistor connected in series;
   a second branch having a second NMOS transistor, two resistors and a second PMOS transistor connected in series; and
   a third branch having two resistors, a first complimentary pair of NMOS and PMOS transistors, and a second complimentary pair of NMOS and PMOS transistors connected in series,
   wherein a first end of the third branch is connected to the first branch to generate a first output, and
   wherein a second end of the third branch is connected to the second branch to generate a second output.

20. The voltage mode driver of claim 16 wherein each of the unit cell drivers comprises one or more band gap regulators for generating an output.

* * * * *